United States Patent
Meier et al.

(10) Patent No.: US 11,756,294 B2
(45) Date of Patent: *Sep. 12, 2023

(54) SCENE CLASSIFICATION

(71) Applicant: Apple Inc., Cupertino, CA (US)

(72) Inventors: Peter Meier, Los Gatos, CA (US); Michael J. Rockwell, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/397,747

(22) Filed: Aug. 9, 2021

(65) Prior Publication Data

US 2021/0365686 A1    Nov. 25, 2021

Related U.S. Application Data

(63) Continuation of application No. 16/370,231, filed on Mar. 29, 2019, now Pat. No. 11,087,136.

(60) Provisional application No. 62/657,570, filed on Apr. 13, 2018.

(51) Int. Cl.
*G06V 20/00*    (2022.01)
*G06V 20/20*    (2022.01)

(52) U.S. Cl.
CPC .............. *G06V 20/35* (2022.01); *G06V 20/20* (2022.01)

(58) Field of Classification Search
None
See application file for complete search history.

(56) References Cited

U.S. PATENT DOCUMENTS

| | | | |
|---|---|---|---|
| 11,087,136 B2* | 8/2021 | Meier | G06V 20/35 |
| 2005/0220341 A1 | 10/2005 | Akahori | |
| 2008/0294400 A1 | 11/2008 | Czora | |
| 2010/0017722 A1* | 1/2010 | Cohen | G09G 5/377 |
| | | | 715/740 |
| 2013/0069985 A1 | 3/2013 | Wong et al. | |
| 2014/0002444 A1 | 1/2014 | Bennett et al. | |
| 2016/0217616 A1 | 7/2016 | Kraver | |

(Continued)

FOREIGN PATENT DOCUMENTS

| | | |
|---|---|---|
| CA | 2953335 A1 | 12/2015 |
| CN | 107450665 A | 12/2017 |
| WO | 2016/106383 A2 | 6/2016 |

OTHER PUBLICATIONS

Advisory Action received for U.S. Appl. No. 16/370,231, dated Mar. 10, 2021, 5 pages.

(Continued)

*Primary Examiner* — Leon Viet Q Nguyen
(74) *Attorney, Agent, or Firm* — DLA PIPER LLP (US)

(57) ABSTRACT

An exemplary process for identifying a type of a physical environment amongst a plurality of types of physical environments is provided. The process includes obtaining, using the one or more cameras, image data corresponding to a physical environment. The process further includes identifying at least one portion of an entity in the physical environment based on the image data; determining, based on the identified at least one portion of the entity, whether the entity is an entity of a first type; determining a type of the physical environment if the entity is an entity of the first type; and presenting one or more virtual objects and a representation of the entity.

24 Claims, 16 Drawing Sheets

(56) References Cited

U.S. PATENT DOCUMENTS

| | | | |
|---|---|---|---|
| 2016/0253842 A1 | 9/2016 | Shapira et al. | |
| 2016/0330522 A1 | 11/2016 | Newell et al. | |
| 2016/0350973 A1 | 12/2016 | Shapira et al. | |
| 2017/0186291 A1 | 6/2017 | Wenus et al. | |
| 2017/0243515 A1 | 8/2017 | Vengroff et al. | |
| 2017/0364766 A1 | 12/2017 | Das et al. | |
| 2018/0374143 A1* | 12/2018 | Williamson | G06Q 30/0643 |
| 2018/0374276 A1 | 12/2018 | Powers et al. | |
| 2019/0122063 A1 | 4/2019 | Kim et al. | |
| 2019/0318168 A1 | 10/2019 | Meier et al. | |
| 2020/0226383 A1 | 7/2020 | Meier et al. | |

OTHER PUBLICATIONS

Applicant-Initiated Interview Summary received for U.S. Appl. No. 16/370,231, dated Nov. 3, 2020, 5 pages.
Applicant-Initiated Interview Summary received for U.S. Appl. No. 16/833,364, dated Mar. 1, 2021, 3 pages.
Final Office Action received for U.S. Appl. No. 16/370,231, dated Nov. 17, 2020, 19 pages.
International Preliminary Report on Patentability received for PCT Patent Application No. PCT/US2018/052990, dated Apr. 9, 2020, 7 pages.
International Search Report and Written Opinion received for PCT Patent Application No. PCT/US2018/052990, dated Dec. 5, 2018, 8 pages.
Non-Final Office Action received for U.S. Appl. No. 16/370,231, dated Aug. 11, 2020, 23 pages.
Non-Final Office Action received for U.S. Appl. No. 16/833,364, dated Oct. 28, 2020, 29 pages.
Notice of Allowance received for U.S. Appl. No. 16/370,231, dated Apr. 8, 2021, 9 pages.
Notice of Allowance received for U.S. Appl. No. 16/833,364, dated Mar. 25, 2021, 9 pages.
Chen, Baoquan, "Composition of Virtual-Real Worlds and Intelligence Integration of Human-Computer in Mixed Reality", Scientia Sinica Informatics, vol. 46, No. 12, 2016, pp. 1737-1747.
Chen, Baoquan, "Composition of Virtual-Real Worlds and Intelligence Integration of Human-Computer in Mixed Reality", Scientia Sinica Informatics, vol. 46, No. 12, 2016, pp. 1737-1747 (Official Copy only). {See Communication under 37 CFR § 1.98(a) (3)}.
Notice of Allowance received for Chinese Patent Application No. 201910291364.2, dated Feb. 22, 2022, 5 pages (1 page of English Translation and 4 pages of Official Copy).
Office Action received for Chinese Patent Application No. 201910291364.2, dated Sep. 1, 2021, 30 pages (13 pages of English Translation and 17 pages of Official Copy).

* cited by examiner

SCENE CLASSIFICATION

CROSS-REFERENCE TO RELATED APPLICATIONS

This application claims priority to U.S. patent application Ser. No. 16/370,231, entitled "SCENE CLASSIFICATION," filed Mar. 29, 2019, which claims priority to U.S. provisional patent application No. 62/657,570, entitled "MIXED REALITY CLASSIFICATION," filed on Apr. 13, 2018, the content of which is incorporated by reference for all purposes.

BACKGROUND

The present disclosure relates generally to computer-generated reality interfaces and, more specifically, to techniques for providing environment-based content using a computer-generated reality interface.

BRIEF SUMMARY

The present disclosure describes techniques for providing content using a computer-generated reality interface depicting virtual objects in combination with a representation of a physical environment. In one exemplary technique, image data corresponding to the physical environment are obtained using one or more cameras. At least one portion of an entity in the physical environment is identified based on the image data. Based on the identified at least one portion of the entity, whether the entity is an entity of a first type is determined. One or more virtual objects and a representation of the entity are displayed.

DETAILED DESCRIPTION

Figure 1A:
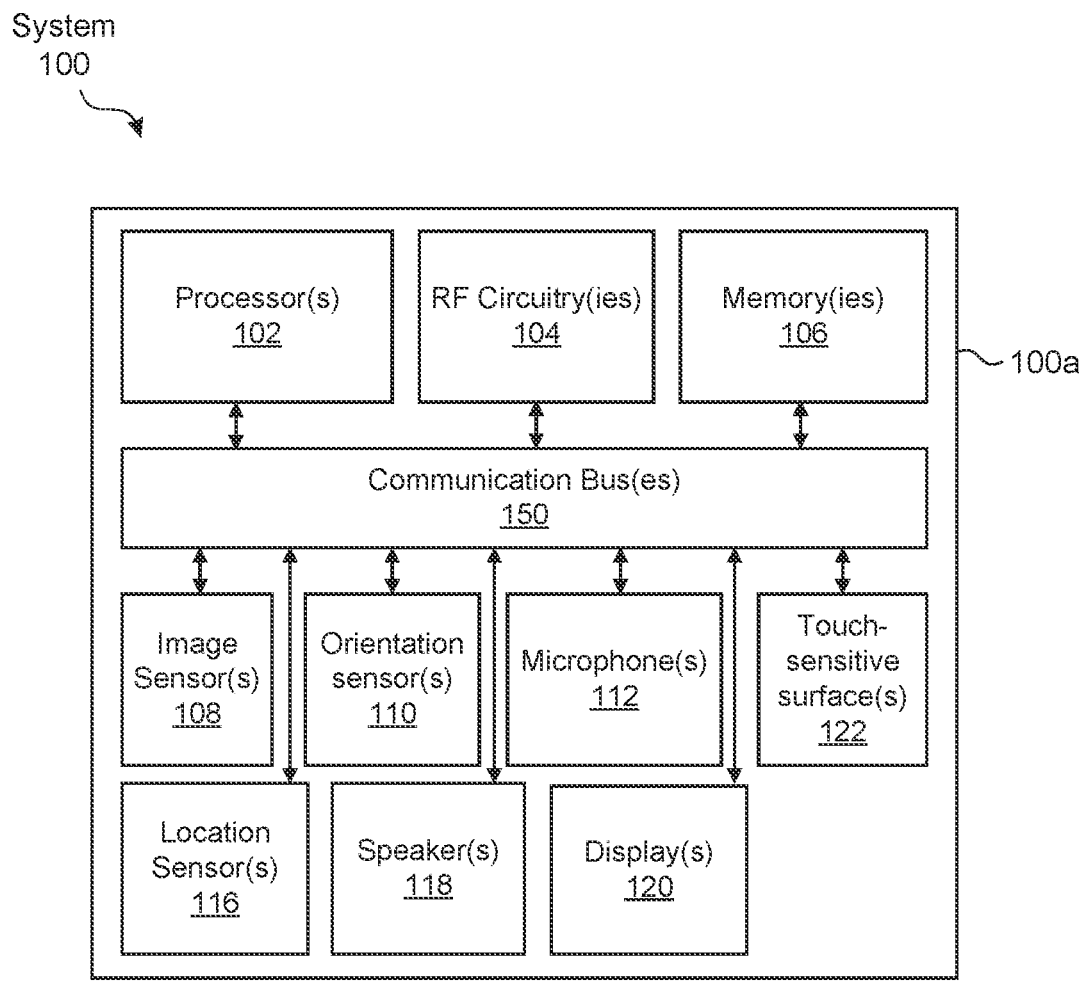
FIGS. 1A-1B depict exemplary systems for use in various computer-generated reality technologies, including virtual reality and mixed reality.

Various embodiments of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment. A virtual object is sometimes also referred to as a virtual reality object or a virtual-reality object.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

By virtue of displaying virtual objects in combination with a representation of a physical environment, electronic devices provide an intuitive CGR interface for a user to interact with his/her physical environment. For example, using a CGR interface, a user can interact with virtual objects provided in the CGR interface to perform certain tasks (e.g., control an oven or order food). One challenge for implementing such an interface is that the virtual objects may not be provided based on the physical environment. For example, a user may be standing in a kitchen while virtual objects related to living room entertainment are provided in the CGR interface. These virtual objects would thus have limited relevance to the physical environment in which the user is currently located. Conventional techniques for determining the user's position, such as global positioning systems (GPS), typically have a positioning error in the range of meters, making it difficult to determine the precise physical environment (e.g., living room, kitchen, bedroom) of a user within, for example, a house or building.

In addition, many current techniques for determining a type of a physical environment use entities identified in a physical environment, but are limited in that they do not distinguish amongst the types of entities identified in the physical environment. As a result, the accuracy of the determination of the type of the physical environment may be compromised or reduced. As an example, certain types of entities (e.g., a ceiling, a wall, or a table) can be found in many types of physical environments (e.g., kitchen, dining room, living room, etc.), and therefore are not reliable indicators of the type of the physical environment. As another example, an entity that is easily moveable (e.g., a cat, a dog) is generally not a reliable indicator of the type of the physical environment.

In accordance with some embodiments described herein, image data corresponding to a physical environment are obtained using one or more cameras. At least one portion of an entity in the physical environment is identified based on the image data. Based on the identified at least one portion of the entity, whether the entity is an entity of a first type is determined. The type of the physical environment is then determined based on the entities of the first type. The first-type entities are also referred to as inlier entities, which are generally reliable indicators for determining the type of a physical environment. Because only entities that are generally reliable indicators for the type of physical environment are used for determining the type of the physical environment, the techniques described in this application require the identification of a fewer number of entities, thereby improving the performance of identifying the type of a physical environment, reducing power consumption, and enhancing operational efficiency.

In some examples, based on the determined type of the physical environment (e.g., living room, kitchen, bedroom, etc.), virtual objects are displayed in a representation of the physical environment to provide one or more services corresponding (e.g., specific) to the type of the physical environment. As a result, the displayed virtual objects are relevant to the type of physical environment (e.g., living room, kitchen, bedroom) within, for example, a house or building. Accurately providing services to the user in this manner enhances the user experience and improves the performance of the system.

Figure 1B:
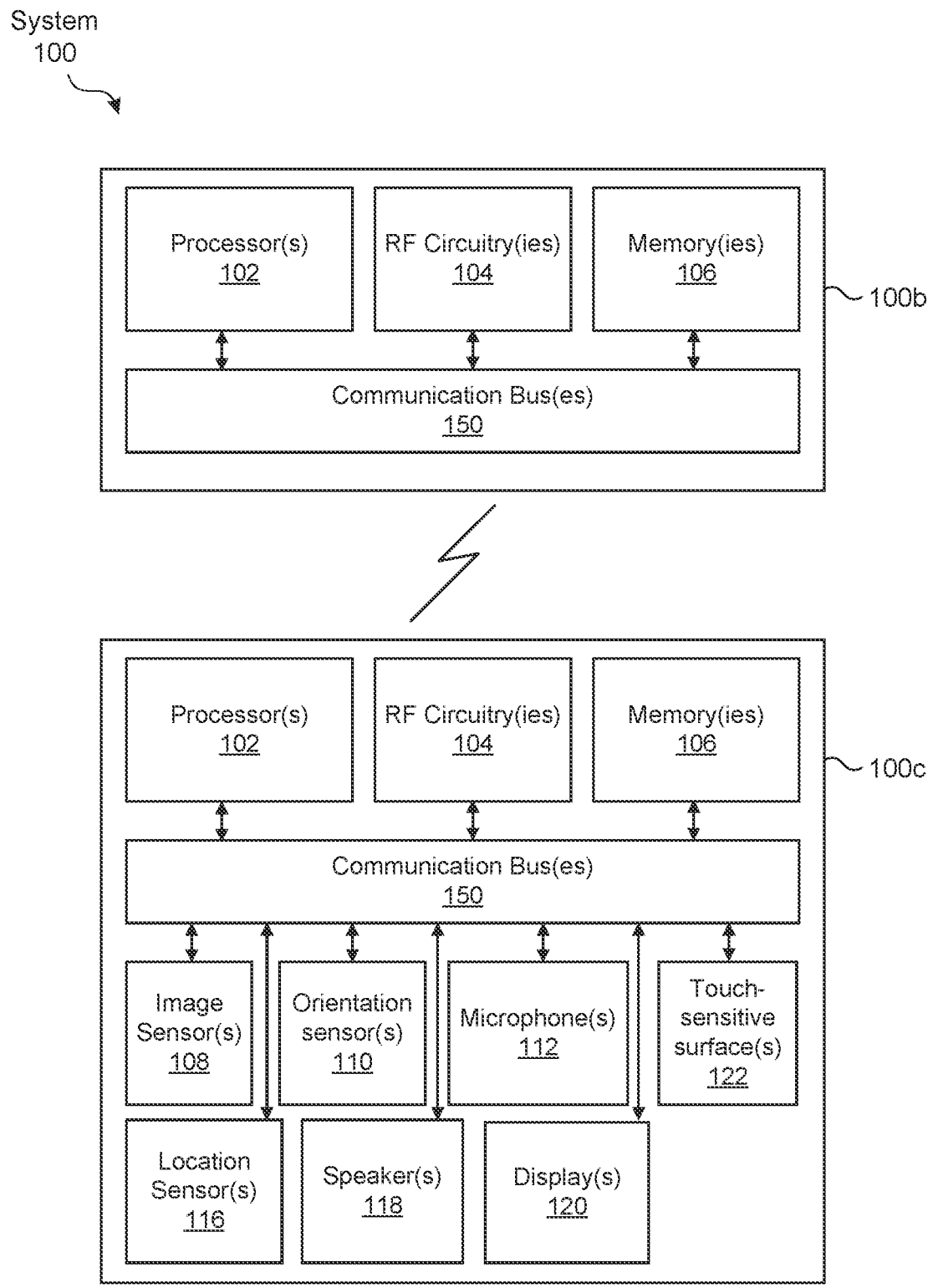

FIG. 1A and FIG. 1B depict exemplary system 100 for use in various computer-generated reality technologies.

In some embodiments, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100*a* is implemented in a base station device or a HMD device.

As illustrated in FIG. 1B, in some embodiments, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

In some embodiments, system 100 is a mobile device. In some embodiments, system 100 is a head-mounted display (HMD) device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2A:
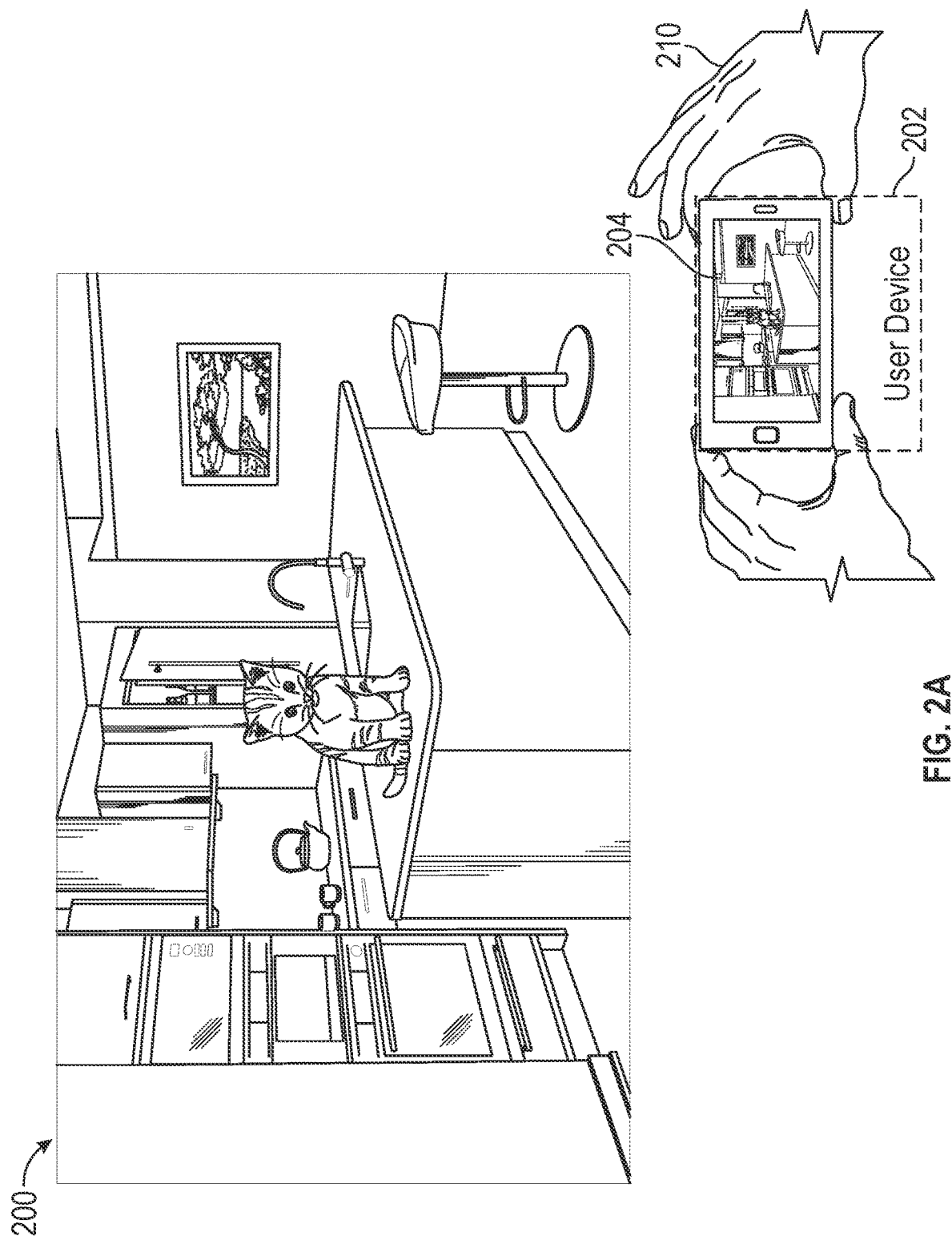
FIG. 2A depicts a user device displaying a representation of an indoor physical environment.

FIG. 2A depicts a user device 202 displaying a representation 204 (e.g., an image) of an indoor physical environment 200, according to various embodiments. In the present embodiment, user device 202 is a standalone device, such as a hand-held mobile device (e.g., a smartphone) or a standalone head-mounted device. It should be recognized that, in other embodiments, user device 202 can be communicatively coupled to another device, such as a base device (e.g., base device 102b. In these embodiments, the operations described below for providing environment-based content in a CGR environment can be shared between user device 202 and the other device.

FIG. 2A illustrates an example in which a user 210 holds user device 202 in the user's hand. In some embodiments, user 210 wears a user device as a head-mounted device. User device 202 can obtain image data using one or more cameras. Exemplary cameras include charge-coupled device (CCD) type cameras.

As described above, in some embodiments, a CGR interface includes a representation of a physical environment and optionally one or more virtual objects. In some embodiments, user device 202 presents (e.g., displays or projects) representation 204 of indoor physical environment 200 using the obtained image data. Representation 204 is a live 2D image or 3D image of the physical environment. Representation 204 is, for example, a representation of the physical environment from the perspective of the user device 202. In FIG. 2A, physical environment 200 is at least a portion of the user's kitchen. Generally, a physical environment can be an indoor environment or an outdoor environment. In an indoor environment, a physical environment can be a specific room or area (e.g., living room, family room, office, kitchen, classroom, cafeteria, or the like). As described in more detail below, user device 202 can provide content (e.g., virtual objects) to the user based on the type of the physical environment. For example, if the physical environment is a kitchen, user device 202 can present corresponding virtual objects, such as a food recipe, controls for operating a coffee machine, or a user-interaction mechanism for ordering food. If the physical environment is a living room, for example, user device 202 can present corresponding virtual objects, such as controls for operating a TV, a user-interaction mechanism for ordering movies, or a user-interaction mechanism for subscribing magazines.

Figure 2B:
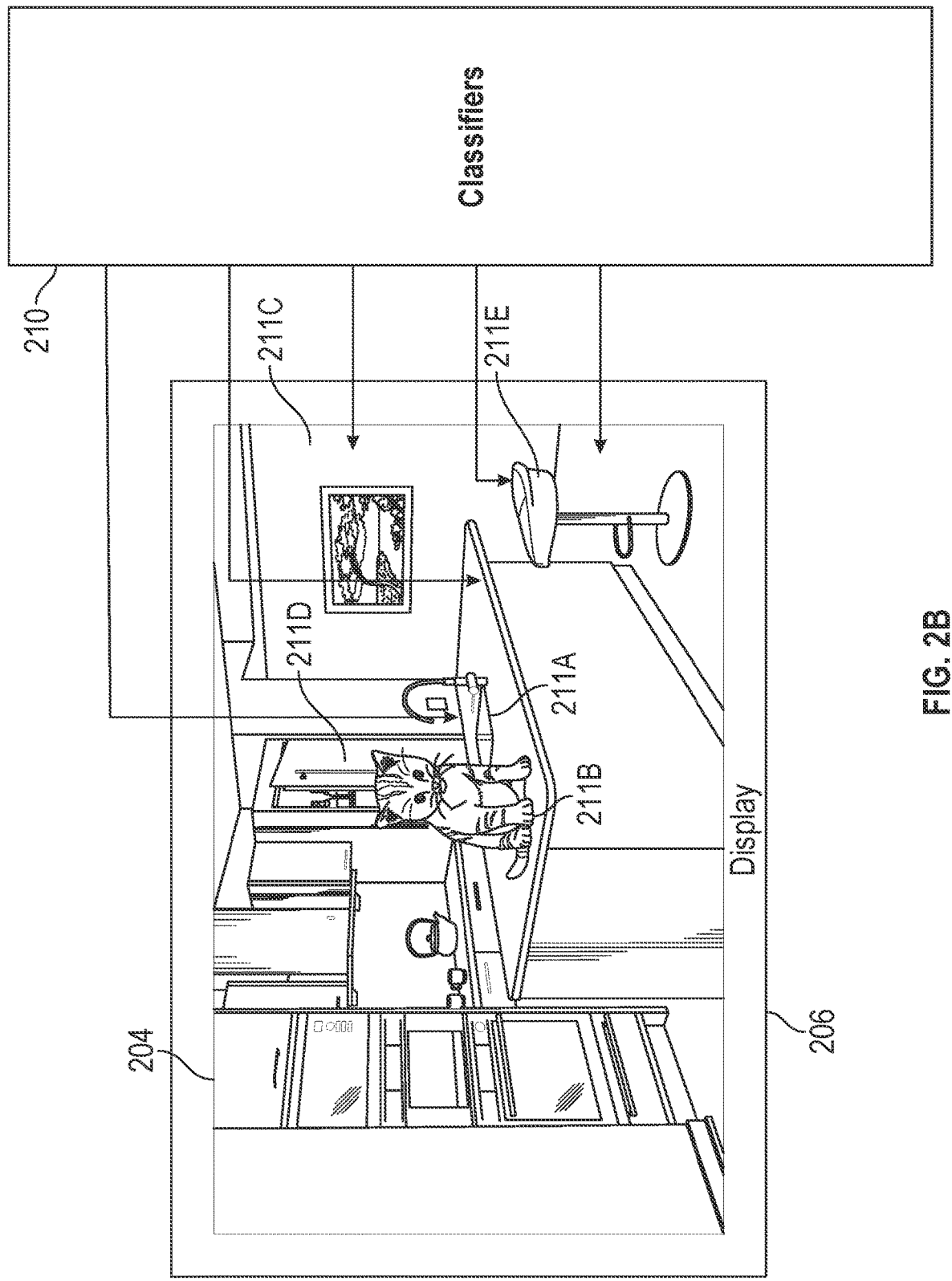
FIG. 2B depicts a block diagram of a user device including classifiers configured to identify one or more entities of an indoor physical environment.

FIG. 2B depicts a block diagram of a user device (e.g., user device 202) including classifiers 210 configured to identify one or more entities of an indoor physical environment. As depicted in FIG. 2B, representation 204 is an image captured or recorded by one or more cameras of the user device 202. In some embodiments, while presenting representation 204 on a display 206 of the user device, the user device performs a classification of one or more entities of the physical environment 200 using classifiers 210. Classifiers 210 can be predefined, dynamically updated, and/or trained over time. In some embodiments, for an indoor physical environment, classifiers 210 include a ceiling classifier, a wall classifier, a table classifier, a chair classifier, a sink classifier, an animal (e.g., cat) classifier, or the like. It is appreciated that the type of classifiers used for classification of physical environments can be predefined based on expected use of the device (e.g., used at a home environment) in any desired manner. Classifiers may be used for any entity type(s) and/or granularity. A classifier may be used to identify a chair, or a specific type of chairs (e.g., lawn chair vs recliner) in some examples.

In some embodiments, the type of classifiers used for classification can also be adjusted (e.g., learned or trained), for instance, using machine learning techniques. For example, based on training data associated with different physical environments, such as those in which the user device has been used in the past (e.g., the physical environments in which the user device has been frequently used are living room, kitchen, etc.), the type of classifiers used for classification (e.g., ceiling classifier, floor classifier, table classifier) can be derived or determined.

As illustrated in FIG. 2B, classifiers 210 identify one or more entities of the physical environment 200, including, but not limited to, a sink 211A, a cat 211B, a wall 211C, a metal piece 211D, and a chair 211E. In some embodiments, classifiers 210 identify an entire entity (e.g., cat 211B) or a portion of an entity (e.g., a corner as a portion of wall 211C). As described in more detail below, in some embodiments, if a first portion of an entity (e.g., a leg of a chair 211E, a corner of wall 211C, or the like) is identified and one or more properties of the entity can be determined without having to identify the entire entity, classifiers 210 can forego identifying another portion of the entity or forego identifying the entire entity. Identifying a portion of the entity, but not the entire entity, can increase identification speed, reduce power consumption, and thus improve operational efficiency of the electronic device. In some embodiments, classifiers 210 identify one or more entities in a physical environment based on hierarchical classification techniques. For example, classifiers 210 perform an initial classification using a subset of predefined classifiers that is less than a full set of available classifiers. The initial classification identifies one or more predefined entities. A geometric layout of the physical environment is estimated based on the identified one or more predefined entities. An area is determined based on the geometric layout and a second level classification is performed using classifiers corresponding to the determined area. Classifiers 210 can thus identify particular entities in the determined area. Because not all available classifiers are used for all entities, the hierarchical classification improves the performance of identifying particular entities in a physical environment, reduces power consumption, and enables real-time classification.

In some embodiments, based on the currently-identified at least one portion of the entity, the user device determines whether the currently-identified at least one portion of the entity corresponds to at least one portion of a previously-identified entity. For example, the user device can store data (e.g., a map) associated with previously-identified entities including their classifications, their positions, relations to each other, layouts, or the like. The user device can compare the data associated with previously-identified entities with the currently-identified at least one portion of an entity, and determine whether the currently-identified at least one portion of the entity corresponds to that of a previously-identified entity. If so, the user device does not perform the determination of one or more properties of the currently-identified entity and in turn, does not determine whether the currently-identified entity is of the first type (e.g., the entity is an inlier that can be used to determine the physical environment the user device is facing or located in). If the currently-identified at least one portion of the entity does not correspond to at least one portion of a previously-identified entity, the user device stores data indicative of the currently-identified at least one portion of the entity, for instance, based on which further entity-type and environment-type determinations are performed. As one example, the user device may have previously identified one or more entities of indoor physical environment 200 as shown in representation 204, such as the sink 211A. After the previous identification is performed by the user device, cat 211B may enter the kitchen (e.g., from another room). Classifiers 210 of the user device can then identify cat 211B and determine that cat 211B does not correspond to any previously identified entity. As a result, the user device can store data associated with cat 211B for further determination or processing. In some embodiments, by determining whether the currently identified entity (or a portion thereof) corresponds to a previously identified entity and performing further determination or processing with respect to an entity that was not previously identified, the user device reduces the consumption of power (e.g., battery power), increases the speed of processing, and thus improves the overall operational efficiency.

Figure 2C:
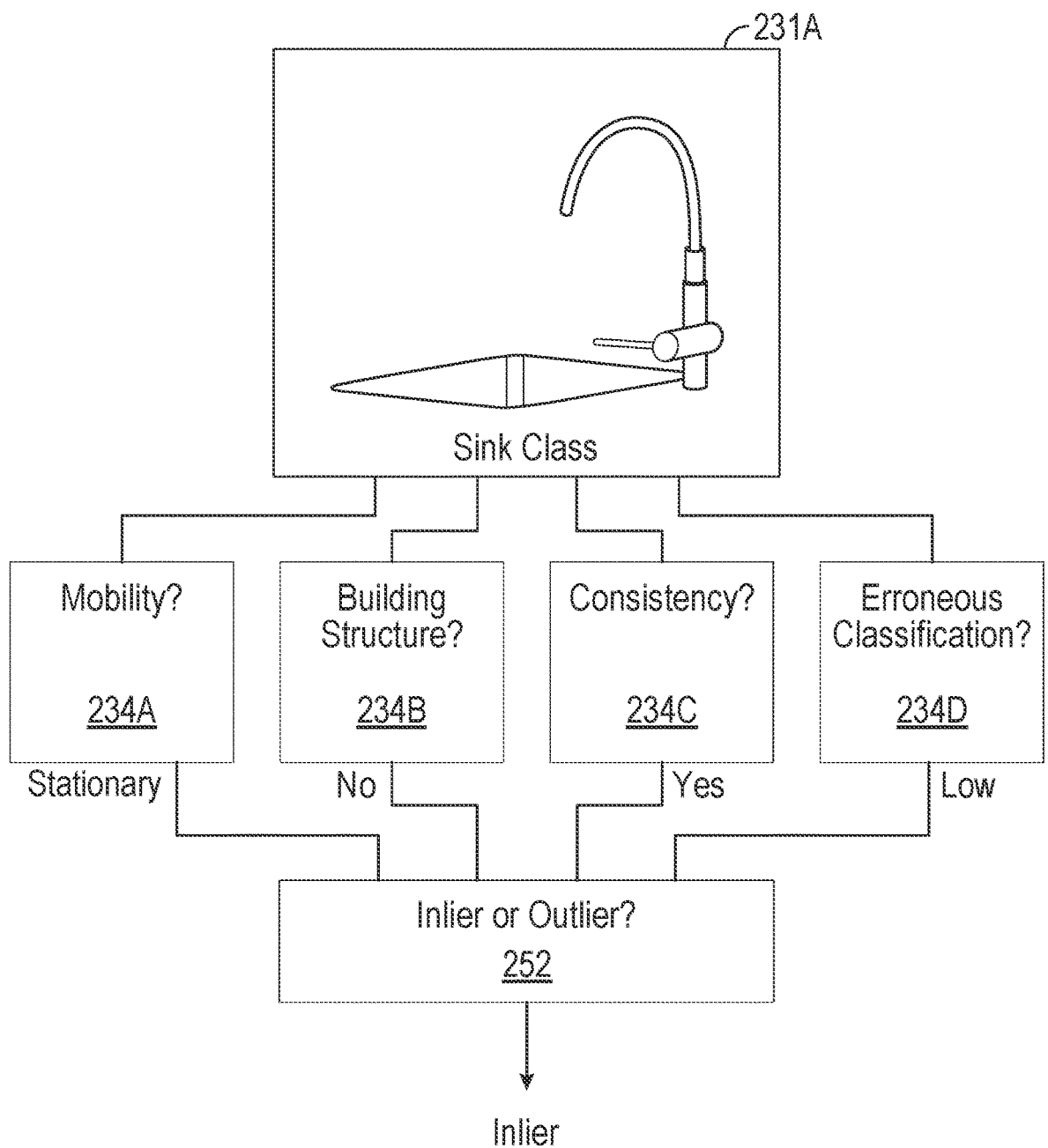
FIGS. 2C-2G depict various flows for classifying identified entities and determining the type of the classified entity, according to an embodiment of the present disclosure.

In some embodiments, based on the identified entity (or a portion thereof), the user device determines one or more properties of the entity. For example, based on the identified at least a portion of the entity, the user device classifies the entity and obtains properties of the entity from a plurality of known or learned entities. With reference to FIG. 2C, the user device identifies a faucet and a container as a portion of sink 211A (shown in FIG. 2B). Based on the identified faucet and container, the user device classifies (e.g., using classifiers 210) the corresponding entity as a sink class entity 231A and determines one or more properties of sink class entity 231A.

As shown in FIG. 2C, one of the entity properties determined by the user device is mobility, as illustrated at determination 234A. Mobility is a property that describes the degree to which an entity is physically moveable (e.g., the ability to change positions over time). As an example shown in FIG. 2C, the user device determines that sink class entity 231A is a fixture and thus highly stationary and/or unlikely to move.

Another entity property determined by the user device is whether the entity is a building structure or a portion thereof, as illustrated at determination 234B. Building structure property is an indication of whether an entity is a portion of a building structure (e.g., a wall, a ceiling, a floor, etc.) As an example shown in FIG. 2C, the user device determines that sink class entity 231A is typically not part of a building structure.

Another entity property determined by the user device is consistency of an entity, as illustrated by determination 234C. Consistency indicates the degree to which the appearance of the entity changes over time. As an example shown in FIG. 2C, the user device determines that the appearance of sink class 231A typically does not change over time and therefore is highly consistent.

Another entity property determined by the user device is the likelihood of an erroneous classification of the entity, as illustrated by determination 234D. As described above, based on the identified at least a portion of the entity, the user device classifies the corresponding entity. For example, based on the identified faucet and container, the user device classifies the entity as a sink class entity 231A. The classification can be associated with a likelihood of error in some examples. For instance, a faucet and a container can also be associated with another entity other than a sink. Thus, in some embodiments, the user device can estimate a likelihood of an erroneous classification (e.g., based on properties of the entity, the class of the entity, and/or other entities in the physical environment). As an example shown in FIG. 2C, the user device determines that the likelihood of an erroneous classification of sink class entity 231A is low. While FIG. 2C illustrates four types of properties that the user device determines, it is appreciated that any number of other types of properties can also be determined.

With reference to FIG. 2C, in some embodiments, based on the one or more determinations (e.g., determinations 234A-D) of the entity properties, the user device determines whether the entity is an entity of a first type. An entity of the first type is, in some examples, also referred to as an inlier entity, which is an entity that can be used for determining a physical environment associated with the entity (e.g., a physical environment in which the entity is located).

In some embodiments, to determine whether the entity is an entity of the first type, the user device determines whether a combination of the one or more properties exceeds a confidence threshold. For example, the user device can determine, for each entity property, a property value or a score. Using the example shown in FIG. 2C, the user device determines that the mobility property value for sink class entity 231A is low (or a corresponding numerical value), indicating that sink class entity 231A is stationary. The user device may also determine that the building structure property value for sink class entity 231A is negative (or a corresponding numerical value), indicating that sink class 231A is not a building structure. The user device may also determine that the consistency property value for sink class entity 231A is high (or a corresponding numerical value), indicating that the appearance of sink class 231A is highly consistent over time. The user device may also determine that the likelihood of an erroneous classification for the sink class entity 231A is low (or a corresponding numerical value), indicating that the confidence of a correct classification for sink 211A is high. It is appreciated that the user device may determine property values or scores of one or more of properties and/or determine property values of any additional properties.

In some embodiments, the user device can also determine a total count of the properties. As described above, the user device may use one or more properties of the entity to determine whether the entity is of the first type. In the example shown in FIG. 2C, one or more properties including mobility, building structure, consistency, and erroneous classification and/or any other properties (not shown) can be used for determining whether the entity is of the first type. If all the properties are used and no other properties are used, the user device determines that the total count of the properties is four.

Based on the combination of the property values or scores and the total count of the properties, the user device can determine whether the entity is an entity of the first type. In some embodiments, to determine the type of the entity, the user device determines whether the combination of the one or more property values and the total count of the one or more properties exceed a confidence threshold. The confidence threshold can be configured based on a comparison of the property values/scores to a type-indicator criteria and the total count of the property values. For example, the confidence threshold can be satisfied with a relatively small count of property values if most or all of the property values of the one or more properties satisfy the type-indicator criteria. Using the example illustrated in FIG. 2C, the user device determines that all property values of the properties (e.g., mobility is low, building structure is negative, consistency is high, and the likelihood of an erroneous classification is low) satisfy the type-indicator criteria. For example, an entity that is stationary, is not part of a building structure, does not change its appearance over time, and is less likely to be erroneously classified is typically a good and reliable indicator of the physical environment (e.g., kitchen) in which the entity is located. The user device therefore determines that the entity type (e.g., inlier or outlier) can be determined based on these 4 (or less) properties (e.g., total count of 4 or less).

In some embodiments, to exceed the confidence threshold when at least some of the property values do not satisfy the type-indicator criteria, a relatively large number of property values may be required for a reliable or accurate determination of the type of the entity. The confidence threshold for determining the type of the entity can thus be configured to require, for example, at least three properties with all properties satisfying the type-indicator criteria, at least five properties with some of the property values at or slightly below the type-indicator criteria, or at least ten properties with some of the property values significantly below the type-indicator criteria. In some embodiments, the confidence threshold and/or criteria for determining a type of an entity can be dynamically updated or learned (e.g., through training of a machine learning model).

In some embodiments, in accordance with a determination that the combination of the one or more property values and the total count of the properties satisfies (e.g., exceeds) the confidence threshold for determining the type of the entity, the user device determines that the entity is of the first type. Continuing with the example shown in FIG. 2C, if the confidence threshold is configured to be at least three properties with all property values above the confidence level criteria, the user device determines that the entity of sink 211A (corresponding to sink class entity 231A) is an entity of the first type (e.g., inliers), which can be used for determining the physical environment associated with the entity (e.g., the physical environment of a kitchen).

In some embodiments, in accordance with a determination that the combination of the one or more property values and the count of the one or more properties does not satisfy (e.g., does not exceed) the confidence threshold, the user device determines that the entity is of a second type that is different from the first type. A second-type entity is, in some examples, also referred to as an outlier, which cannot be used to determine the physical environment associated with the entity. Identification and classification of a second-type entity is described below in more detail in FIGS. 2D-2F.

Figure 2D:
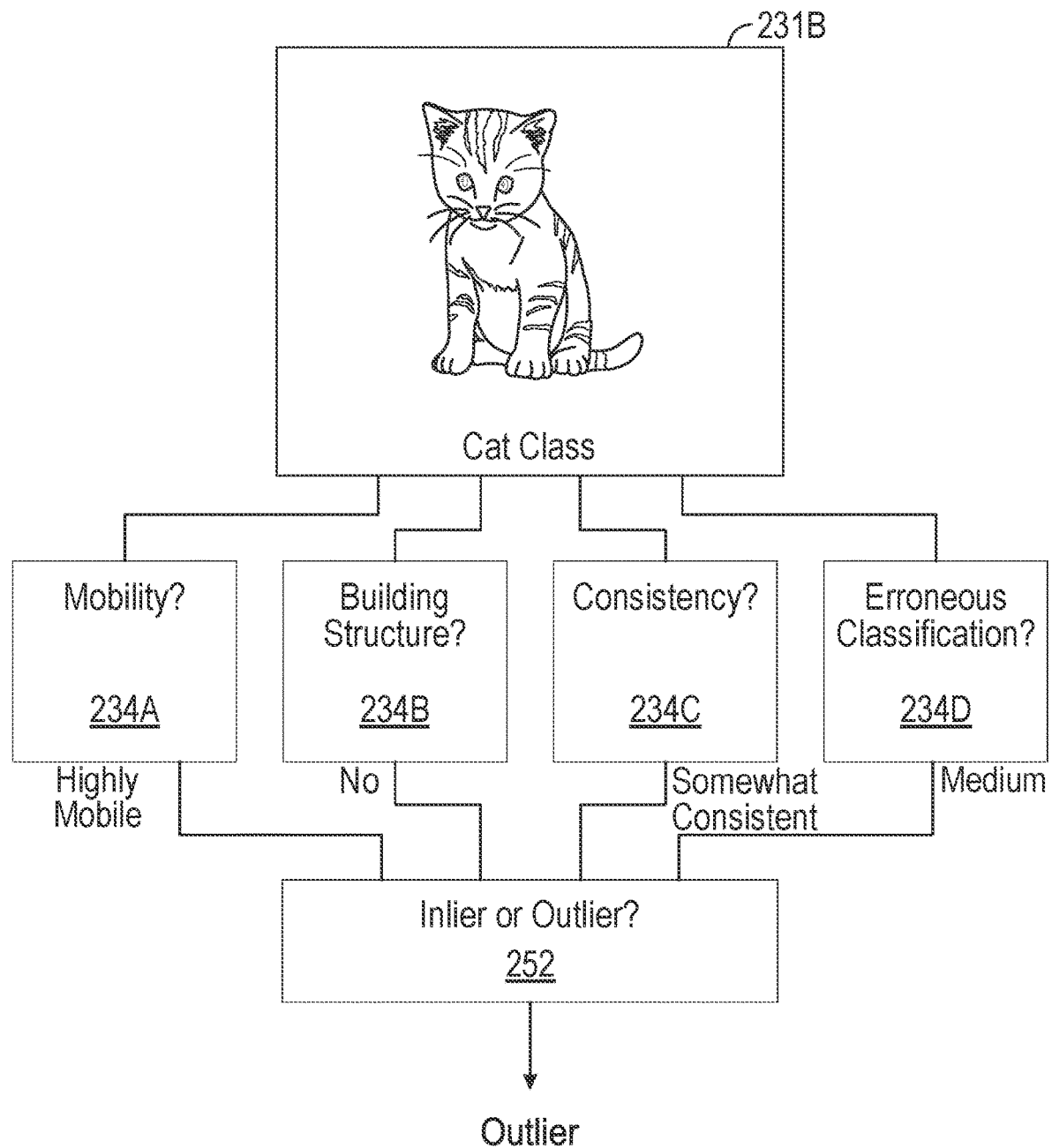

As described above with respect to FIG. 2B, classifiers 210 identify at least a portion of cat 211B. Thereafter, as shown in FIG. 2D, the user device determines one or more properties of cat 211B based on the identified at least a portion of cat 211B. The user device identifies, for example, a leg, a tail, and/or whiskers of the cat 211B. Based on the identified leg, tail, and/or whiskers, the user device classifies (e.g., using classifier 210) the corresponding entity as a cat class entity 231B and determines properties of cat class entity 231B. In some embodiments, the user device determines properties without first classifying the corresponding entity to a particular class entity. For example, using the identified leg of cat 211B, and without classifying the corresponding entity to a cat class entity, the user device can determine the mobility property value of the cat 211B (e.g., the corresponding entity is likely highly mobile because anything with a leg is likely mobile).

FIG. 2D depicts a flow for classifying an identified entity and determining the type of the classified entity, according to an embodiment of the present disclosure. With reference to FIG. 2D, properties the user device determines can include mobility, building structure property, consistency, likelihood of erroneous classification, and/or any other properties. For example, as illustrated in determinations 234A-D in FIG. 2D, the user device determines that cat class entity 231B is highly mobile; is not a building structure; is somewhat consistent over time; and has a medium likelihood of erroneous classification (e.g., something with a leg, tail, and whiskers may also be other animals like a tiger), respectively. Based on the determined properties, the user device further determines whether a combination of the one or more properties exceeds a confidence threshold. Continuing with the example shown in FIG. 2D, the user device determines that the property value for mobility is high (or a corresponding numerical value), indicating that cat class entity 231B is stationary. The user device may also determine that the building structure property value is negative (or a corresponding numerical value), indicating that cat class entity 231B is not a building structure. The user device may also determine that the property value for consistency is medium (or a corresponding numerical value), indicating that the appearance of cat class entity 231B may change over time (e.g., as the cat gets dirty or old over time). The user device may also determine that the property value for the likelihood of an erroneous classification is medium (or a corresponding numerical value), representing that the confidence of a correct classification for cat 211B to cat class entity 231B is in the medium range. It is appreciated that the user device may determine property values of one or more of properties as illustrated at determinations 234A-D and/or determine property values of additional properties.

Based on the combination of the property values and the total count of the properties, the user device determines whether the entity is of the first type by, for example, determining whether the combination satisfies a confidence threshold. Continuing with the example shown in FIG. 2D, the user device determines that the mobility property values for cat class entity 231B does not satisfy the type-indicator criteria (e.g., a highly mobile entity is generally not a reliable indicator of the type of physical environment). The user device may also determine that the building structure property value (e.g., negative) satisfies the type-indicator criteria; that the consistency property value (e.g., somewhat consistent) is at or slightly above the type-indicator criteria; and that the likelihood of erroneous classification (e.g., medium) is at or slightly below the type-indicator criteria. Further, the user device determines the total count of the properties used for determining the type of the entity. In the example shown in FIG. 2D, the user device may use, for example, properties including mobility, consistency, and erroneous classification for such determination because a cat class entity 231B is clearly not a building structure and thus the building structure property may be less relevant and therefore given no or less weight. The total count is thus three.

As described above, to determine the entity type, the user device determines whether the combination of the one or more property values and the count of the one or more properties satisfies a confidence threshold. For example, if the confidence threshold is configured to be at least three properties with all property values above the confidence level criteria, the user device determines that cat 211B (corresponding to cat class entity 231B) is an entity of a second type (e.g., an outlier), which cannot be used for determining the physical environment associated with the entity. In the example shown in FIG. 2D, an entity of cat can be present in any physical environment and is thus a less reliable indicator for the type of physical environment.

Figure 2E:
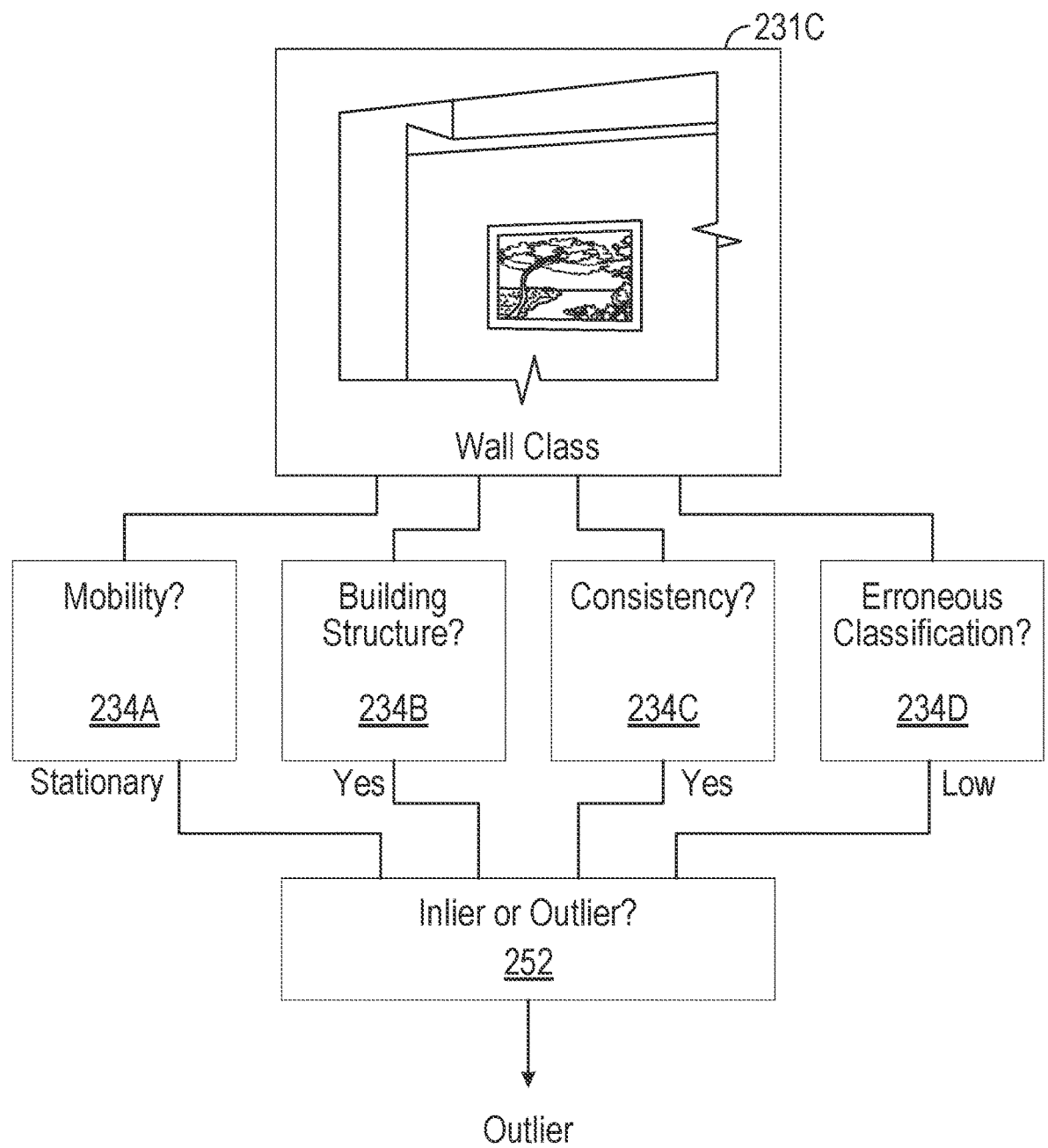

FIG. 2E illustrates another flow for classifying an identified entity and determining the classified entity, according to an embodiment of the present disclosure. As described above with respect to FIG. 2B, classifiers 210 identify at least a portion of wall 211C (e.g., a corner of wall 211C). As shown in FIG. 2E, based on the identified at least a portion of wall 211C, the user device determines one or more properties of the wall 211C. For example, based on the corner of wall 211C, the user device classifies (e.g., using classifier 210) wall 211C as a wall class entity 231C and determines properties of wall class entity 231C.

With reference to FIG. 2E and similar to those described above, properties the user device determines can include mobility, building structure property, consistency, likelihood of erroneous classification, and/or any other properties. For example, corresponding to properties as illustrated at determinations 234A-D, the user device determines that wall class entity 231C is not mobile; is a building structure; is consistent over time; and has a medium likelihood of erroneous classification (e.g., mistakenly classify a shelf having a corner as a wall), respectively. In some embodiments, similar to those described above, the user device determines whether a combination of the one or more properties exceeds a confidence threshold. Using the example shown in FIG. 2E, the user device determines that the building structure property value is positive (or a corresponding numerical value), indicating that wall class entity 231B is a building structure. As described above, a building structure may not be a reliable indicator for the type of physical environment because it is a common entity found in many types of physical environments. The user device may also determine that the mobility property value is low, that consistency property value is high, and that the likelihood of an erroneous classification is medium (or corresponding numerical values). It is appreciated that the user device may determine property values as illustrated at determinations 234A-D and/or determine property values of additional properties.

Based on the combination of the property values and the total count of the properties, the user device can determine whether the entity is of the first type by, for example, determining whether the combination satisfies a confidence threshold. Continuing with the example shown in FIG. 2E, the user device determines that the mobility property values of mobility (e.g., stationary) satisfies the type-indicator criteria; that the building structure property value of (e.g., positive) does not satisfy the type-indicator criteria; that the consistency property value (e.g., highly consistent) satisfies the type-indicator criteria; and that the likelihood of erroneous classification (e.g., medium) satisfies the type-indicator criteria. Further, the user device determines the total count of the properties used for determining the type of the entity. In the example shown in FIG. 2E, the user device may use, for example, properties of building structure, consistency, and erroneous classification for such determination. The user device may also assign more weight to the building structure property and assign less or no weight to mobility property because a building structure is clearly not mobile and thus the mobility property of mobility is less relevant.

As described above, to determine the entity type, the user device determines whether the combination of the one or more property values and the count of the one or more properties satisfies a confidence threshold. For example, if the confidence threshold is configured to be at least three properties with all property values exceeding the type-indicator criteria, the user device determines that wall 211C (corresponding to wall class entity 231C) is an entity of a second type (e.g., an outlier), which cannot be used for determining the physical environment associated with the entity. In the example shown in FIG. 2E, an entity of wall can be present in any indoor physical environment and is thus a less reliable indicator for the type of physical environment.

Figure 2F:
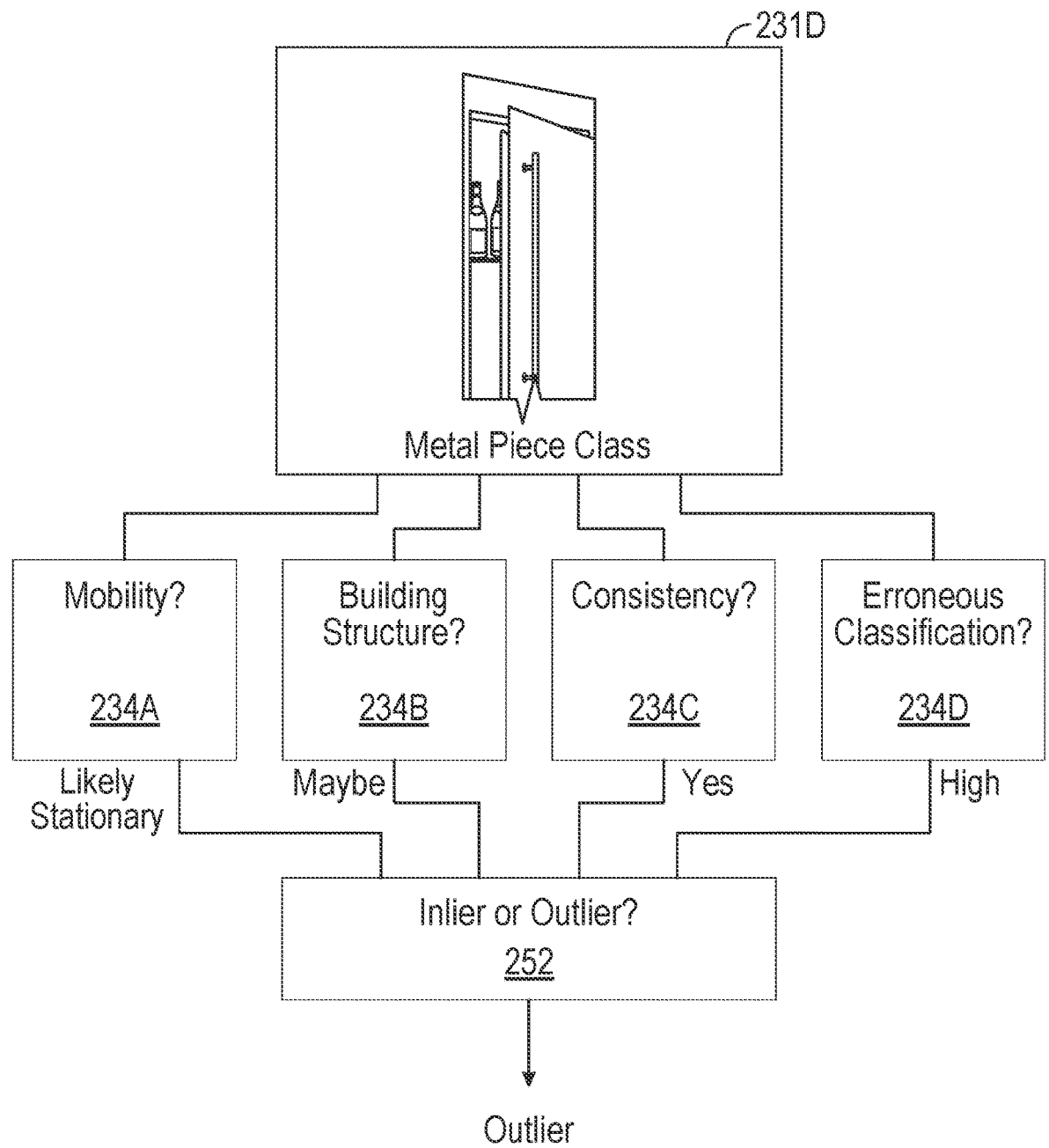

FIG. 2F depicts another flow for classifying an identified entity and determining the classified entity, according to an embodiment of the present disclosure. As described above with respect to FIG. 2B, classifiers 210 identify metal piece 211D as a portion of a refrigerator, but may not identify the entity as a refrigerator. As shown in FIG. 2F, based on the identified metal piece 211D, the user device determines one or more properties of metal piece 211D. In some embodiments, to determine the properties of the entity, the user device classifies (e.g., using classifier 210) the entity as a metal piece class entity 231D and determines properties of metal piece class entity 231D.

With reference to FIG. 2F, properties determined by the user device can include mobility, building structure property, consistency, likelihood of erroneous classification, and/or any other properties. For example, corresponding to properties as illustrated at determinations 234A-D, the user device determines that metal piece class entity 231D is likely not mobile; may be a building structure; is consistent over time; and has a high likelihood of erroneous classification (e.g., a metal piece can be attached or a portion of various different entities such as an appliance, a building structure, a shelf, a door, a knife, a cooking pot, etc.), respectively. Similar to those described above, the user device determines whether a combination of the one or more properties and a total count of the properties exceeds a confidence threshold. Using the example shown in FIG. 2F, the user device may determine that the likelihood of an erroneous classification is high (or a corresponding numerical value), indicating that the confidence of a correct classification for metal piece 211D is low because a metal piece can be a portion of any entity. The user device can also determine that the mobility property value is low to medium; that the building structure property value is somewhere between positive and negative; and that the consistency property value 234C is high (or corresponding numerical values). It is appreciated that the user device may determine property values of one or more of properties as illustrated at determinations 234A-D and/or determine property values of additional properties.

Based on the combination of the property values and the total count of the properties, the user device can determine whether the entity is of the first type. As described above, in some embodiments, the user device determines whether the combination of the one or more property values and the count of the one or more properties satisfies a confidence threshold. Continue with the example shown in FIG. 2F, the user device determines that the mobility property value (e.g., likely stationary) is at or slightly above the type-indicator criteria; that the building structure property value of (e.g., between positive and negative) is at or slightly below the type-indicator criteria; that the consistency property value (e.g., highly consistent) satisfies the type-indicator criteria; and that the likelihood of erroneous classification (e.g., high) does not satisfy the type-indicator criteria. Further, the user device determines the total count of the properties used for determining the type of the entity. In the example shown in FIG. 2F, the user device may use, for example, all properties including the mobility, building structure, consistency, and erroneous classification for such determination. The user device may also assign more weight to the property of likelihood of erroneous classification because an initial correct classification can be a significant factor for the subsequent determination of the properties.

As described above, to determine the entity type, the user device determines whether the combination of the one or more property values and the total count of the one or more properties satisfies a confidence threshold. For example, if the confidence threshold is configured to be at least three properties with all property values above the type-indicator criteria, the user device determines that metal piece 211D (corresponding to metal piece class entity 231D) is an entity of the second type (e.g., an outlier), which cannot be used for determining the physical environment associated with the entity. In the example shown in FIG. 2F, an entity of a metal piece can be present as a part of an entity in any physical environment and is thus not a reliable indicator for the type of physical environment.

Figure 2G:
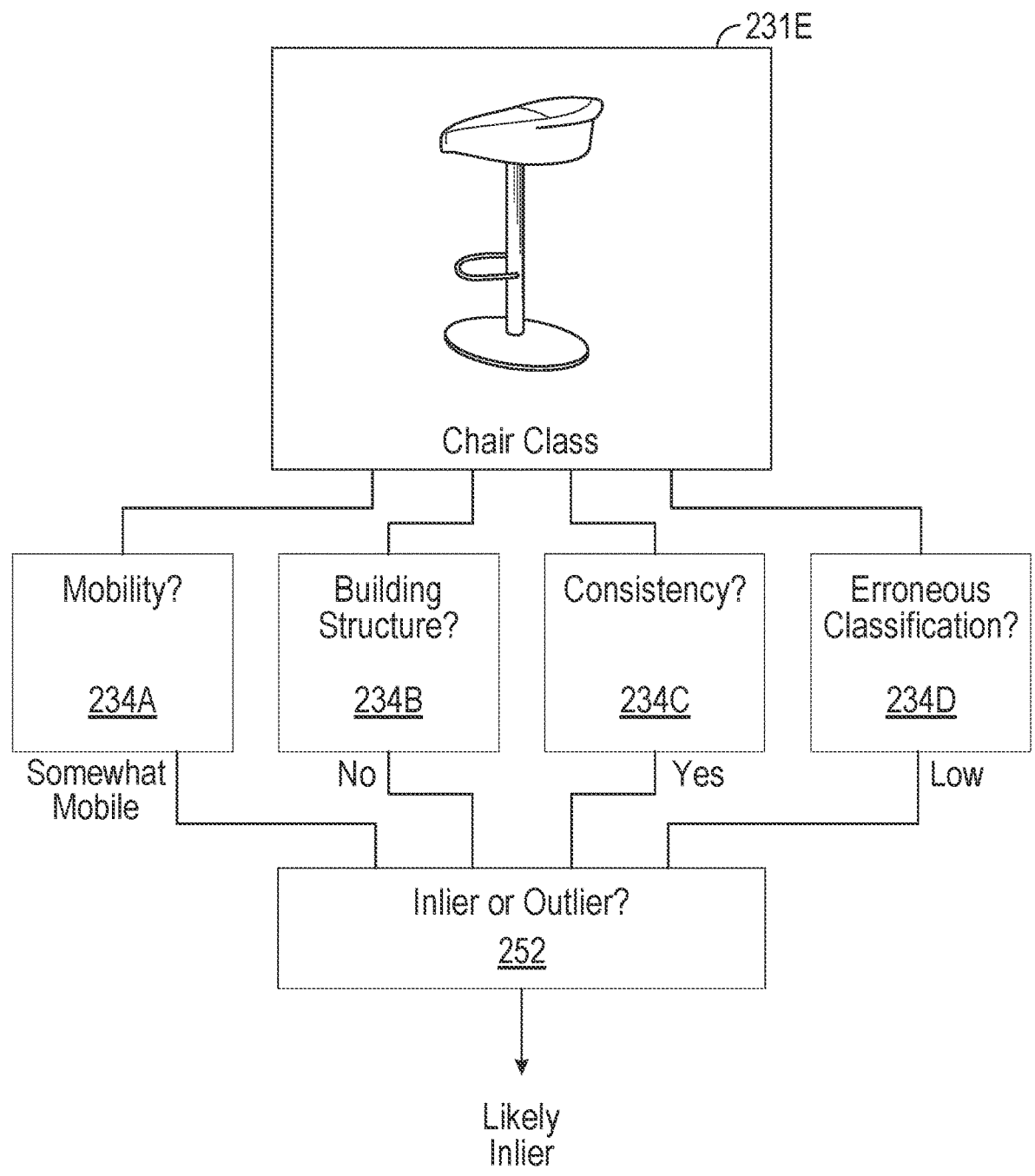

FIG. 2G illustrates another flow for classifying an identified entity and determining the type of the classified entity, according to an embodiment of the present disclosure. As described above with respect to FIG. 2B, classifiers 210 identify chair 211E of the physical environment 200. As shown in FIG. 2G, based on the identified chair 211E, the user device determines one or more properties of chair 211E. In some embodiments, to obtain the properties of the entity, the user device classifies (e.g., using classifier 210) chair 211E as a chair class entity 231E and obtains properties of chair class entity 231E.

With reference to FIG. 2G and similar to those described above, properties the user device can determine include mobility, building structure, consistency, likelihood of erroneous classification, and/or any other properties. For example, corresponding to properties as illustrated at determinations 234A-D, the user device determines that chair class entity 231E is somewhat mobile (e.g., a chair can be fixed to the floor or moved to another place); is not a building structure; is consistent over time; and has a low likelihood of erroneous classification, respectively. In some embodiments, similar to those described above, the user device determines whether a combination of the one or more properties and a total count of the properties exceeds a confidence threshold. Using the example shown in FIG. 2G, the user device determines that the mobility property value is medium; that the building structure property value is negative; that the consistency property value is high; and that the likelihood of an erroneous classification is low (or corresponding numerical values). It is appreciated that the user device may determine property values of one or more of properties as illustrated at determinations 234A-D and/or determine property values of additional properties.

Based on the combination of the property values or score and the total count of the properties, the user device can determine whether the entity is of the first type. As described above, in some embodiments, the user device determines whether the combination of the one or more property values and the total count of the one or more properties satisfies a confidence threshold. Continuing with the example shown in FIG. 2G, the user device determines that the mobility property values (e.g., likely stationary) is at or slightly above the type-indicator criteria; that the building structure property value of (e.g., negative) satisfies type-indicator criteria; that the consistency property value (e.g., highly consistent) satisfies the type-indicator criteria; and that the likelihood of erroneous classification (e.g., low) satisfies the type-indicator criteria. Further, the user device determines the total count of the properties used for determining the type of the entity. In the example shown in FIG. 2G, the user device may use, for example, all four properties including mobility, building structure, consistency, and likelihood of erroneous classification for such determination. The user device may also assign more weight to the mobility property and/or the likelihood of erroneous classification. For example, if chair class entity 231E is a bar-type chair class entity and is fixed to the floor, it is a significant factor for determining the type of the physical environment (e.g., kitchen). If chair class entity 231E is a regular movable chair class entity and can be moved from one place to another, it is a less significant factor for determining the type of the physical environment because a regular moveable chair can be located in any physical environment.

As described above, to determine the type of the entity, the user device determines whether the combination of the one or more property values and the count of the one or more properties satisfies a confidence threshold. If the confidence threshold is configured to be, for example, at least four properties with all property values above the confidence level criteria, the user device determines that chair 211E (corresponding to chair class entity 231D) is likely an entity of the first type (e.g., inliers), which can be used for determining the physical environment associated with the entity.

In some embodiments, the determination of whether the entity is an entity of the first type is based on training data. For example, based on machine learning techniques, the user device can be trained with training data for determining types of various entities. The user device can also learn and improve entity type determination over time.

Figure 2H:
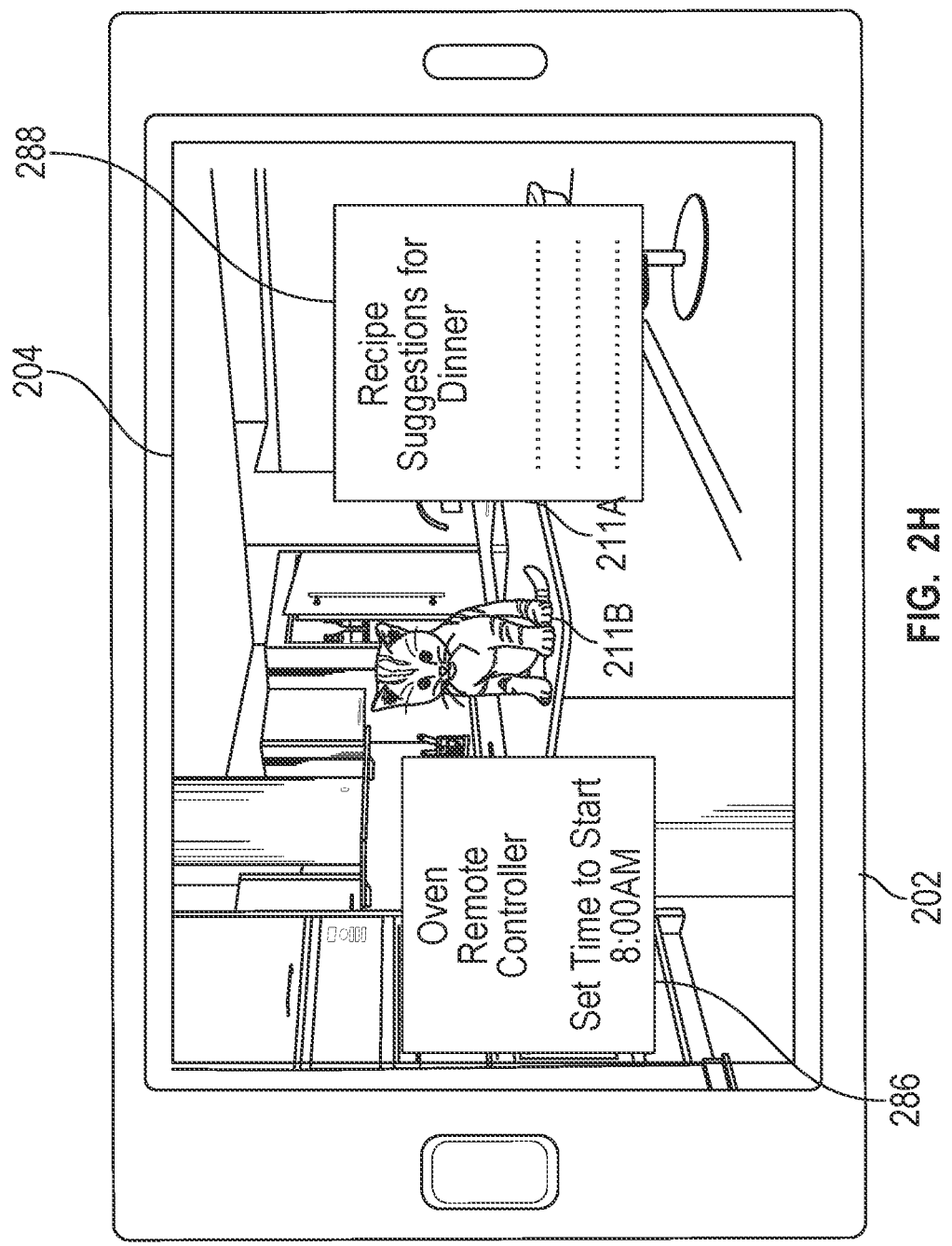
FIG. 2H depicts a user device displaying a computer-generated reality interface including virtual objects and representations of identified entities.

With reference to FIG. 2H, in some embodiments, based on the determination that one or more entities in the physical environment are entities of the first type (e.g., inliers), the user devices determines the type of the physical environment associated with the entities. As described above with respect to the examples shown in FIGS. 2B-2G, the user device determines that sink 211A and chair 211E are likely first-type entities (e.g., inliers), and that cat 211B, wall 211C, metal piece 211D are second-type entities (e.g., outliers). In some embodiments, based on the determination that the entities identified include at least one first-type entity, the user device can proceed to determine the type of the physical environment. For example, based on the determination that the physical environment includes sink 211A, the user device may determine that the physical environment is a kitchen. In some embodiments, the user device may require more than one first-type entity for determining the type of the physical environment. For example, the user device may identify and/or classify one or more additional entities (e.g., chair 211E, oven, refrigerator, countertop, microwave, stove, etc., as shown in FIG. 2B) to determine the type of the physical environment. Identifying more entities of the first type can improve the accuracy of the determination and reduce the likelihood of error, thereby improving the operating efficiency and user satisfaction.

In some embodiments, the user device performs the determination of the type of the physical environment by comparing the one or more entities of the first type (e.g., sink 211A and chair 211E) to one or more entities determined to be associated with the kitchen type of physical environment. If a number or percentage of the entities of the first type matching with entities associated with a type of the physical environment is greater than a threshold number or percentage (e.g., 90%), the user device determines that the type of the physical environment is the predefined type (e.g., kitchen).

In some embodiments, more than one type of physical environment may include the same particular entities. For example, with reference to FIG. 2B, the user device identifies the faucet and container as sink 211A and determines that sink 211A is an entity of the first type (e.g., because it is not mobile, consistent over the time, not a building structure, and likelihood of erroneous classification is low). A sink, for example, can be a kitchen sink or a bathroom sink. As a result, the user device may not be able to determine, based solely on sink 211A, the type of physical environment the user device is facing or located in.

In some embodiments, the user device can be configured to determine the type of physical environment using other information in addition to the one or more entities of the first type (e.g., sink 211A). Such additional information includes, for example, other entities in the physical environment if any (e.g., the oven, microwave, countertop, etc., shown in FIG. 2B), the geometric layout of the physical environment, and/or context information, for instance of the electronic device. As one example, the user device can use other entities in the physical environment, in addition to sink 211A, to determine that the type of the physical environment is a kitchen. As another example, the user device can identify a napkin holder and determine that a napkin holder is an entity of the first type, but cannot determine the type of environment based solely on the napkin holder because it is moveable. The user device can use context information, such as the frequency the napkin holder has been moved in the past, to determine that it is rarely moved out of the dinner room. As a result, the user device can determine that the type of the physical environment is a dining room. In some embodiments, based on the additional information, the user device can select one of a plurality of types of physical environments (e.g., kitchen, bathroom) as the type of physical environment associated with the user device.

In some embodiments, the user device may not be able to determine the type of the physical environment (with or without additional information) or may need confirmation from the user as to the type of the physical environment. Thus, in some examples, after the user device determines a plurality of candidate physical environments, the user device outputs the determined physical environments (e.g., visually and/or audibly outputs), and receives a selection of one of the plurality of candidate physical environments from the user.

With reference to FIG. 2H, in some embodiments, based on the determined type of the physical environment, the user device is configured to present one or more virtual objects corresponding to the determined type of the physical environment. As illustrated in FIG. 2H, in some embodiments, user device 202 presents a representation 204 of the physical environment 200, which as described, may be determined to be a kitchen. Representation 204 can be, for example, a 2D image, a video, an animation, a 3D image, or any type of visual representation of the physical environment or particular entities of the physical environment. For example, user device 202 presents a representation of the identified entities (first type and second type) in the physical environment (e.g., an image of sink 211A, an image of cat 211B, etc.).

In some embodiments, user device 202 can be configured to, while presenting representation 204 of the kitchen, provide one or more services using one or more of the virtual objects corresponding to the physical environment. With reference to FIG. 2H, as described above, the type of the physical environment in this embodiment is determined to be a kitchen. As a result, user device 202 can provide, for example, a virtual object 286 (e.g., a virtual remote controller) enabling the user to control the oven (e.g., set the time for baking 2 hours); and a virtual object 288 (e.g., a user-interaction mechanism) providing recipe suggestions for dinner to the user. In some embodiments, the virtual objects can be superimposed (e.g., overlaid) on a representation. Virtual objects can also be presented in a separate display area of user device 202 or another device communicatively coupled to user device 202.

In some embodiments, a user device presents one or more virtual objects without (e.g., prior to) determining the type of the physical environment. For example, the user device may identify a TV entity in the physical environment. By way of example, in some embodiments, the user device determines that services can be provided based on the identified entity regardless of the type of physical environment. For instance, a TV guide service or TV subscription service can be provided regardless of whether the TV entity is located in a bedroom or a living room. Accordingly, the user device is configured to present one or more virtual objects based on the identified TV entity (e.g., a virtual object enabling the user to receive an on-line movie streaming service) without having to determine the type of physical environment (e.g., whether the physical environment is a living room or bedroom).

In some embodiments, after the user device presents one or more virtual objects, the user device receives input representing a selection a virtual object of the one or more presented virtual objects (e.g., from a user of the user device), and performs one or more tasks in accordance with the selected virtual object. For example, the user device may receive a selection of virtual object 288. Based on the selection, the user device can further present the details of the recipe suggestions and/or hyperlinks to websites for buying ingredients of the recipe.

In some embodiments, the determination of the type of the physical environment is based on some or all of the entities located in the field-of-view of the user device. In the above examples, the entities located in the field-of-view of the user device may include a sink, a cat, a chair, an oven, a refrigerator, etc. The determination of the type of the physical environment is thus based on these entities. In some examples, the field-of-view of the user device changes as the user device is positioned to face another direction. The determination of the type of the physical environment can thus be updated or re-performed based on the entities located in the changed field-of-view. Further, the virtual objects presented on the user device can also be updated correspondingly to the entities in the changed field-of-view. For example, rather than presenting virtual objects 286 and 288, the user device can present other virtual objects corresponding to the entities located in the changed field-of-view (e.g., a virtual object enabling the user to receive a movie streaming service if one of the entities located in the changed field-of-view is a TV).

While the above examples are directed to an indoor physical environment (e.g., a kitchen), it is appreciated that techniques describes above can also be used for an outdoor physical environment. FIGS. 3A-3E depict representations of entities of an outdoor physical environment, flows for classifying identified entities and determining the type of the classified entities, and a CGR interface including virtual objects.

Figure 3A:
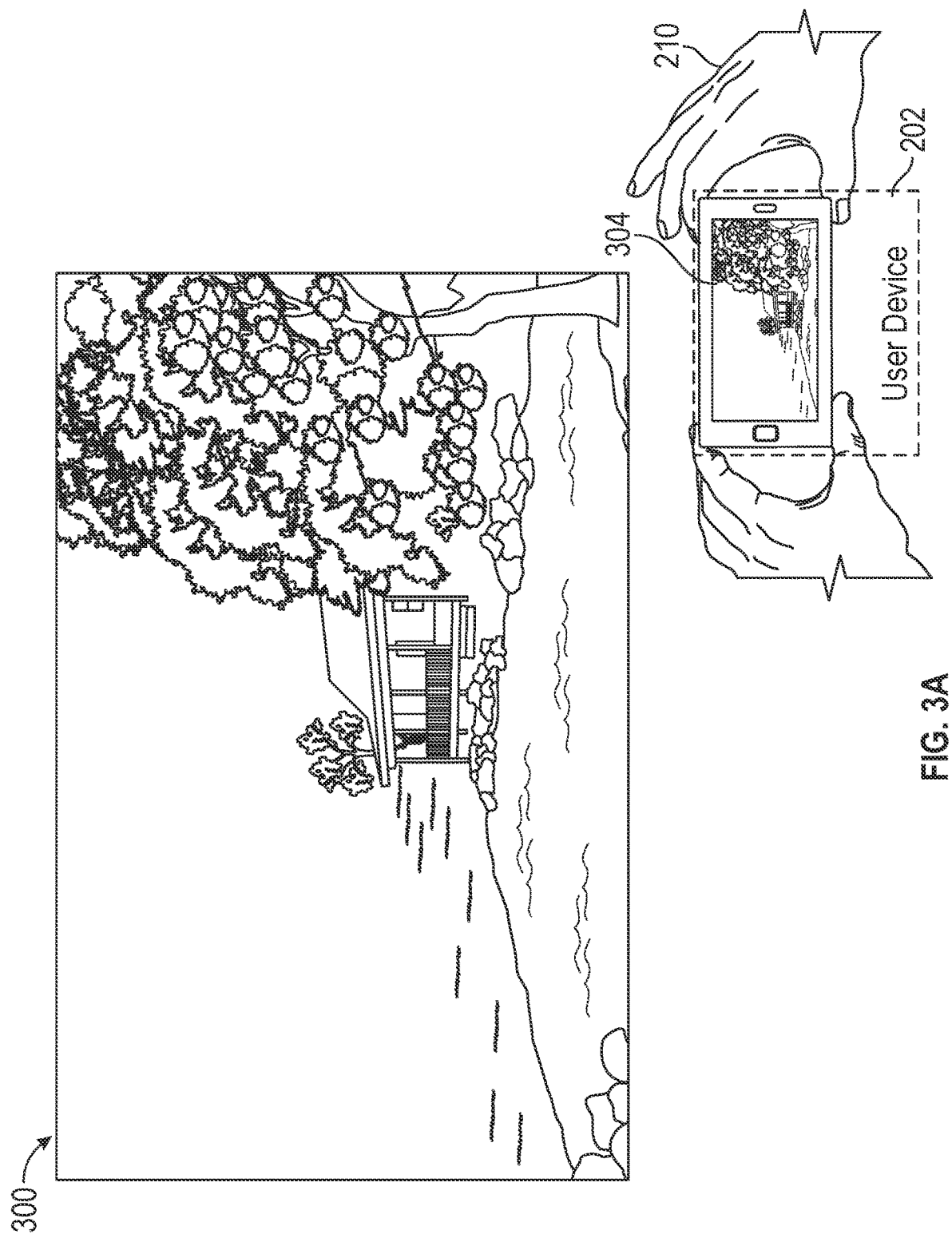
FIG. 3A depicts a user device displaying a representation of an outdoor physical environment.

FIG. 3A depicts a user device 202 presenting a representation 304 of an outdoor physical environment 300. FIG. 3A illustrates an example where a user 210 holds user device 202 in the user's hand. In some embodiments, user 210 wears a user device as a head-mounted device. User device 202 can obtain image data using one or more cameras. Exemplary cameras include charge-coupled device (CCD) type cameras and event cameras.

In some embodiments, user device 202 presents representation 304 of the outdoor physical environment 300 using the obtained image data. Representation 304 is a live 2D image or 3D image of physical environment 300 from the perspective of the user device 202. In FIG. 3A, physical environment 300 is at least a portion of a park.

Figure 3B:
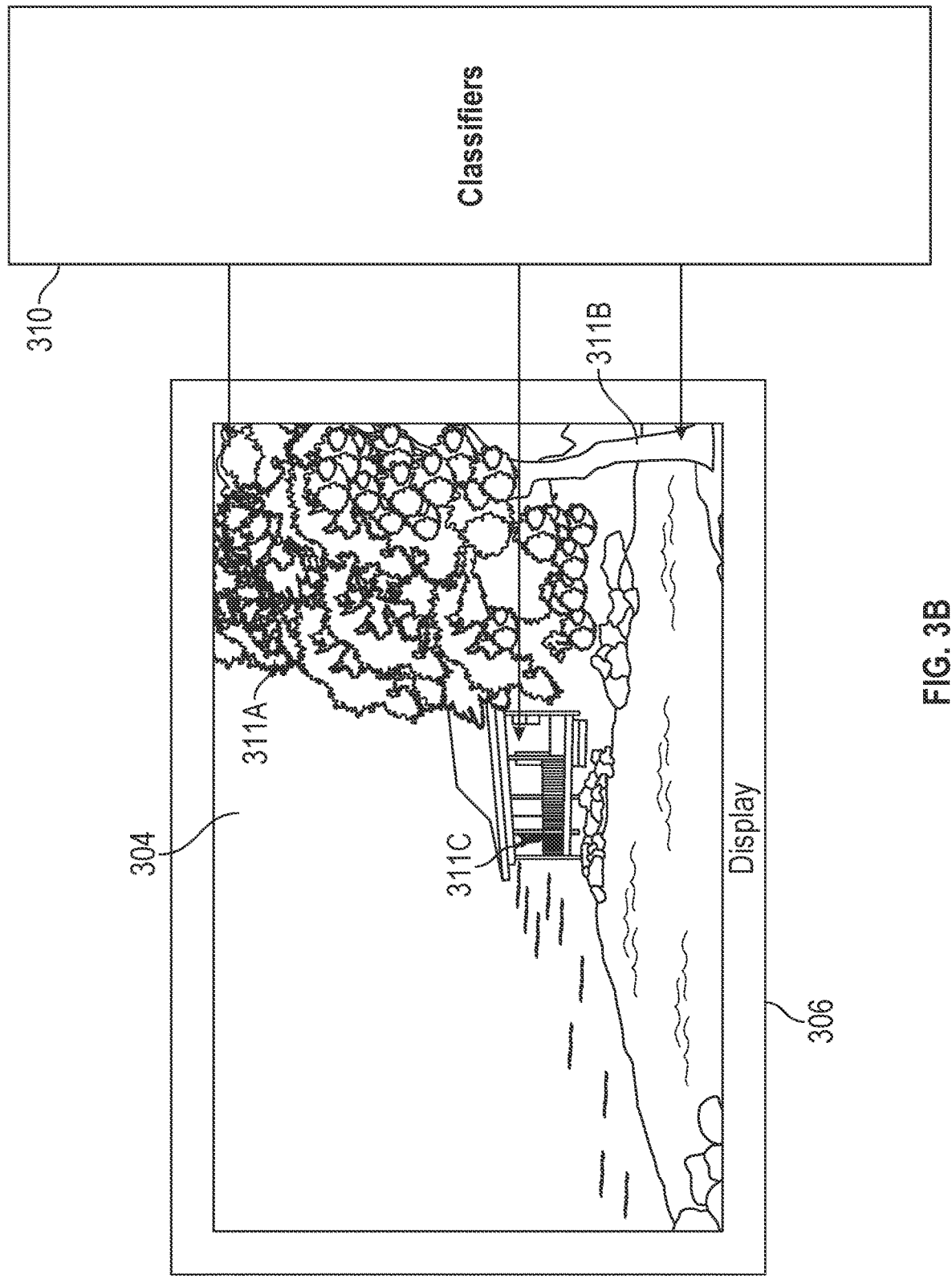
FIG. 3B depicts a block diagram of a user device including classifiers configured to identify one or more entities of an outdoor physical environment.
Figure 3C:
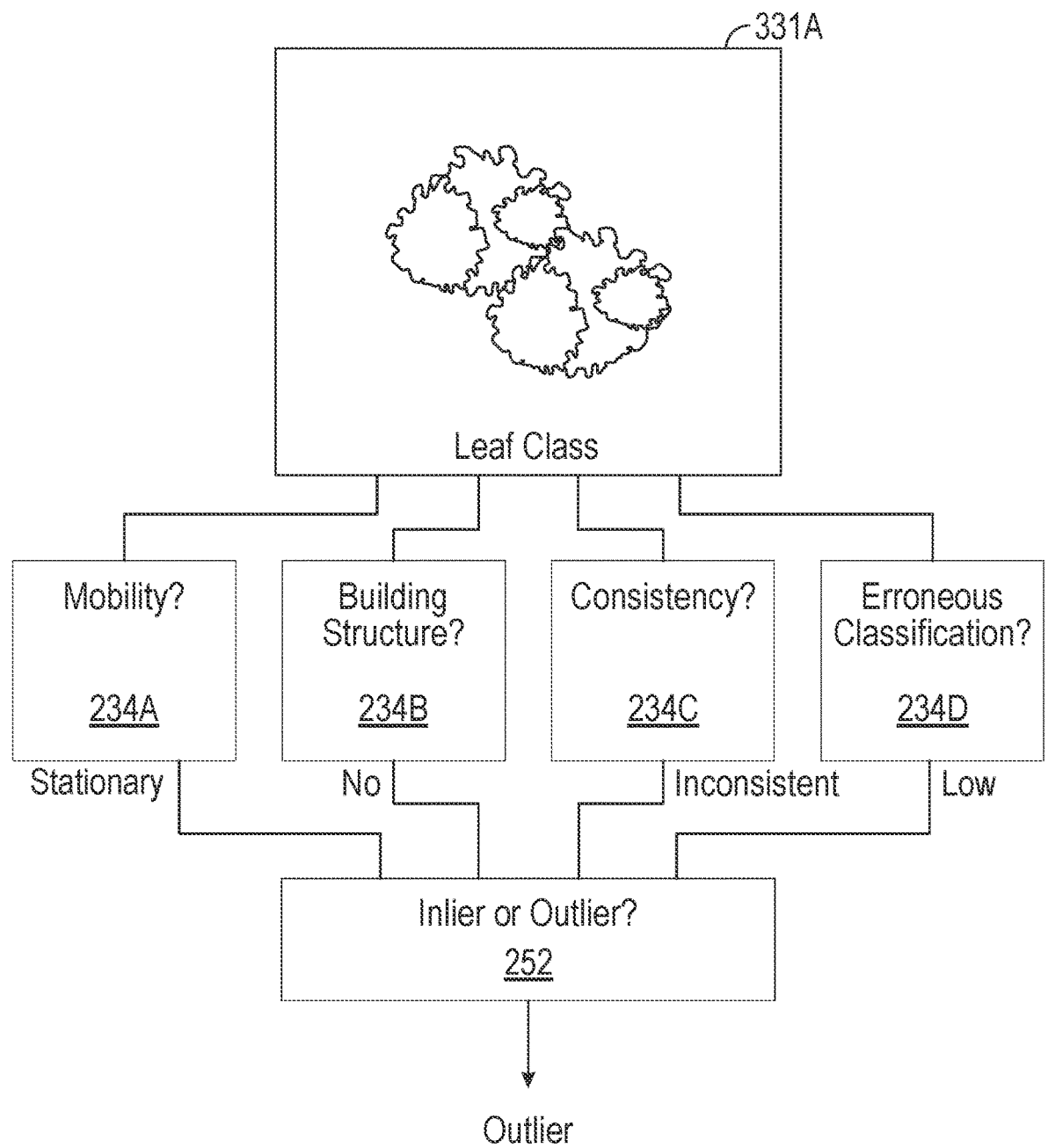
FIGS. 3C-3D depict various flows for classifying identified entities and determining the type of the classified entity, according to an embodiment of the present disclosure.

FIG. 3B depicts a block diagram of a user device (e.g., user device 202) including classifiers 310 configured to identify one or more entities of an outdoor physical environment. As depicted in FIG. 3B, representation 304 is an image captured or recorded by one or more cameras of the user device. In some embodiments, while presenting representation 304 on a display 306 of the user device, the user device performs classification using classifiers 310. Classifiers 310 can be predefined, dynamically updated, and/or trained over time. In some embodiments, for an outdoor environment, classifiers 310 include a tree classifier, a leaf classifier, a building classifier, a lake classifier, a lawn classifier, or the like. Thus, classifier 310 can include different classifiers from classifier 210, which is used for indoor environment. In some embodiments, classifiers 310 identify one or more entities in a physical environment based on hierarchical classification techniques described above. As illustrated in FIG. 3B, classifiers 310 identify one or more entities including, but not limited to, a tree leaf 311A, a tree trunk 311B, a house 311C, etc. In some embodiments, classifiers 310 identify the entire entity (e.g., house 311C) or a portion of an entity (e.g., tree leaf 311A and tree trunk 311B of a tree). In some embodiments, based on the identified entity (or a portion thereof), the user device determines one or more properties of the entity. For example, based on the identified portion of the entity, the user device classifies the entity and determines properties of the entity from a plurality of known or learned entities. FIG. 3C depict a flow for classifying an identified entity and determining the type of the classified entity, according to an embodiment of the present disclosure. With reference to FIG. 3C, the user device identifies one or more leafs. Based on the identified leafs, the user device classifies (e.g., using classifier 310) the entity as a leaf class entity 331A and determines properties of leaf class entity 331A.

As shown in FIG. 3C, and similar to those described above, one of the properties that the user device determines is mobility, as illustrated at determination 234A. As an example shown in FIG. 3C, the user device determines that leaf class entity 331A is typically not movable (e.g., stationary) or only slightly moveable in a short distance (e.g., leaves can be moving in wind). Another property determined by the user device is building structure property, as illustrated at determination 234B. As an example shown in FIG. 3C, the user device determines that leaf class entity 331A is typically not part of a building structure. Another property determined by the user device is consistency, as illustrated at determination 234C. As an example shown in FIG. 3C, the user device determines that the appearance of leaf class entity 331A typically changes over time (e.g., change based on season) and therefore is inconsistent.

Another property determined by the user device is the likelihood of an erroneous classification of the entity, as illustrated at determination 234D. As an example shown in FIG. 3C, the user device determines that the likelihood of erroneous classification of leaf class entity 331A is low. While FIG. 3C illustrates four types of properties that the user device determines, it is appreciated that other types of properties can also be determined.

With reference to FIG. 3C, in some embodiments, based on the one or more determinations (e.g., determinations 234A-D) of the entity properties, the user device determines whether the entity is an entity of the first type. As described above, the user device can determine property values or scores for each property and a total count of the properties. Using the example shown in FIG. 3C, the user device determines that the consistency property value for leaf class entity 331A is low (or a corresponding numerical value), indicating leaf class entity 331A can change its appearance over time (e.g., change based on the season). The user device can further determine that the building structure property value for leaf class entity 331A is negative; that the mobility property value is low (or a corresponding numerical value); and that the likelihood of an erroneous classification is low (or corresponding numerical values). It is appreciated that the user device may determine property values of one or more of properties as illustrated at determinations 234A-D and/or determine property values of additional properties.

Based on the combination of the property values or score and the total count of the properties, the user device can determine whether the entity is of the first type. As described above, in some embodiments, the user device determines whether the combination of the one or more property values and the count of the one or more properties satisfies a confidence threshold. Continue with the example shown in FIG. 3C, the user device determines that the consistency property value (e.g., inconsistent) does not satisfy the type-indicator criteria. Typically, an entity that changes its appearance over time is not a reliable indicator of the type of physical environment. The user device further determines that the mobility property values (e.g., stationary) satisfies the type-indicator criteria; that the building structure property value (e.g., negative) satisfies the type-indicator criteria; and that the likelihood of erroneous classification (e.g., low) satisfies the type-indicator criteria. Further, the user device determines the total count of the properties used for determining the type of the entity. In the example shown in FIG. 3C, the user device may use, for example, properties including the mobility, the building structure, and the consistency for such determination because a leaf class entity 331A is clearly not a building structure and thus the building structure property is less relevant, and thus given no or less weight.

As described above, to determine the type of the entity, the user device determines whether the combination of the one or more property values and the total count of the one or more properties satisfies a confidence threshold. The confidence threshold can be pre-configured, dynamically updated, and/or learned over time. If the confidence threshold is configured to be at least three properties with all property values above the type-indicator criteria, the user device determines that tree leaf 311A (corresponding to leaf class entity 331A) is an entity of the second type (e.g., an outlier), which cannot be used for determining the physical environment associated with the entity. In the example shown in FIG. 3C, a leaf entity can change its appearance over time and thus is unlikely a reliable indicator for the type of physical environment.

Figure 3D:
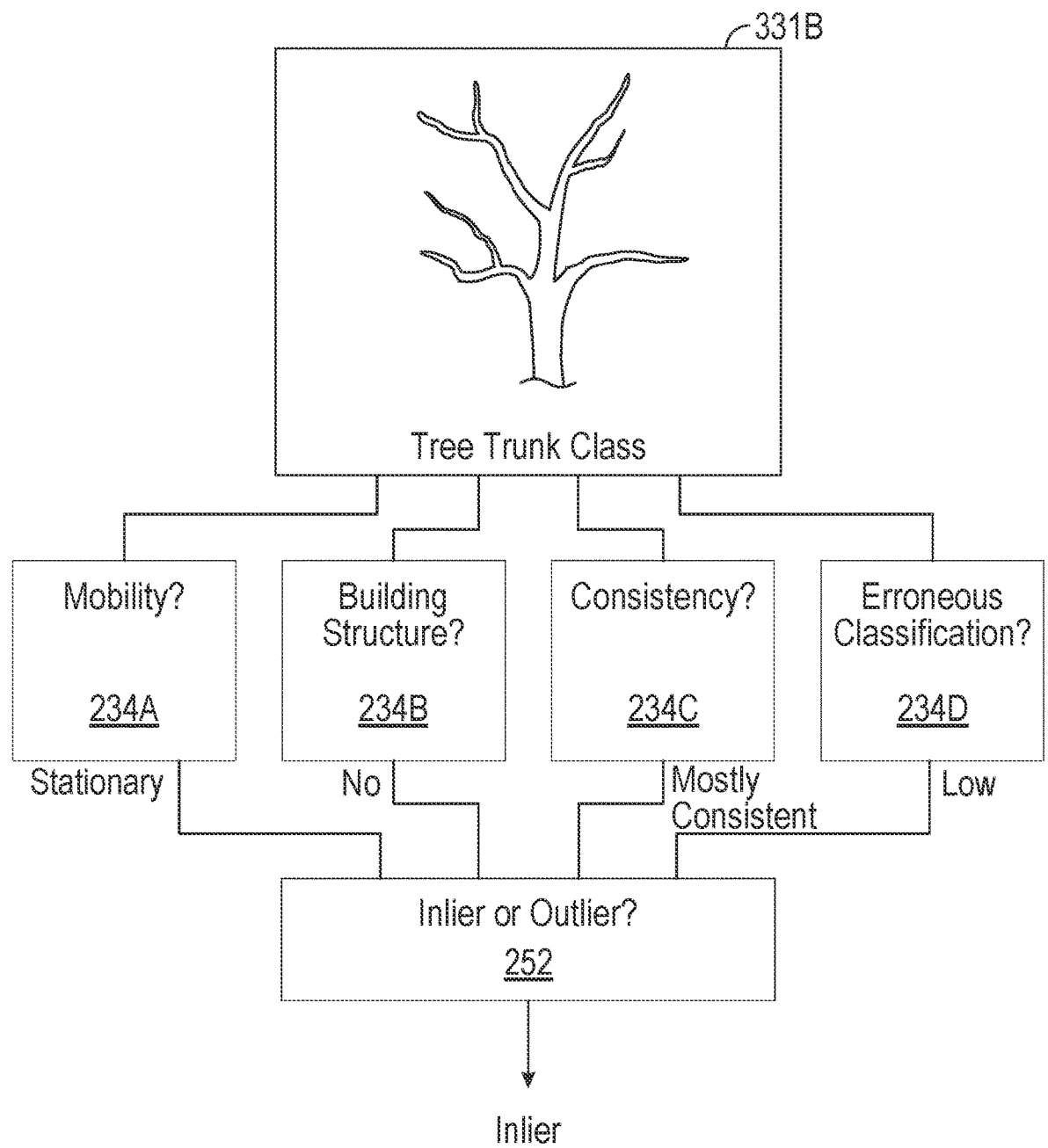

FIG. 3D illustrates another flow for classifying an identified entity (e.g., tree trunk 311B) and determining the type of tree trunk class entity 331B. As shown in FIG. 3D, the user device can determine the properties as illustrated at determinations 234A, 234B, and 234D similar to those described above with respect to FIG. 3C. For example, the user device determines that trunk class entity 331B is typically not movable (e.g., stationary), is not part of a building structure, and the likelihood of erroneous classification of trunk class entity 331B is low.

Another property that the user device can determine is consistency property as illustrated at determination 234C. As an example shown in FIG. 3D and unlike that in FIG. 3C, the user device determines that the appearance of trunk class entity 331B typically does not changes over time (e.g., does not change based on season) and therefore is consistent.

With reference to FIG. 3D, in some embodiments, based on a combination of the one or more properties (e.g., mobility, building structure, consistency, and/or erroneous of classification) of the entity and a total count of the properties, the user device determines whether the entity is an entity of the first type. As described above, the user device can determine property values or scores for each property and a total count of the properties. Using the example shown in FIG. 3D, the user device determines that the mobility property value for tree trunk class entity 331B is low; that the building structure property value is negative; that the consistency property value is high; and that the likelihood of an erroneous classification is low (or a corresponding numerical value), representing that the confidence of a correct classification for trunk class entity 311B is high. It is appreciated that the user device may determine property values of one or more of properties as illustrated at determinations 234A-D and/or determine property values of additional properties.

In some embodiments, the user device can also determine a total count of the properties. In the example shown in FIG. 3C, one or more properties as illustrated at determinations 234A-D and/or any other properties (not shown) can be used for determining whether the entity is of the first type. For example, if the mobility, the consistency, and the erroneous classification properties are used but the building structure property is not used (because it is less relevant and therefore given no weight), the user device determines that the total count of the properties is three.

Based on the combination of the property values or score and the total count of the properties, the user device can determine whether the entity is of the first type. As described above, in some embodiments, the user device determines whether the combination of the one or more property values and the count of the one or more properties satisfies a confidence threshold. Continuing with the example shown in FIG. 3D, the user device determines that the mobility property values (e.g., stationary) satisfies the type-indicator criteria; that the consistency property value (e.g., highly consistent) satisfies the type-indicator criteria; and that the likelihood of erroneous classification (e.g., low) satisfies the type-indicator criteria.

As described above, to determine the type of the entity, the user device determines whether the combination of the one or more property values and the total count of the one or more properties satisfies a confidence threshold. For example, if the confidence threshold is configured to be at least three properties with all property values above the confidence level criteria, the user device determines that tree trunk 311B (corresponding to tree trunk class entity 331B) is an entity of the first type (e.g., an inlier), which can be used for determining the physical environment associated with the entity. In the example shown in FIG. 3D, an entity of tree trunk does not change its appearance over time and thus can be a reliable indicator for the type of physical environment.

Figure 3E:
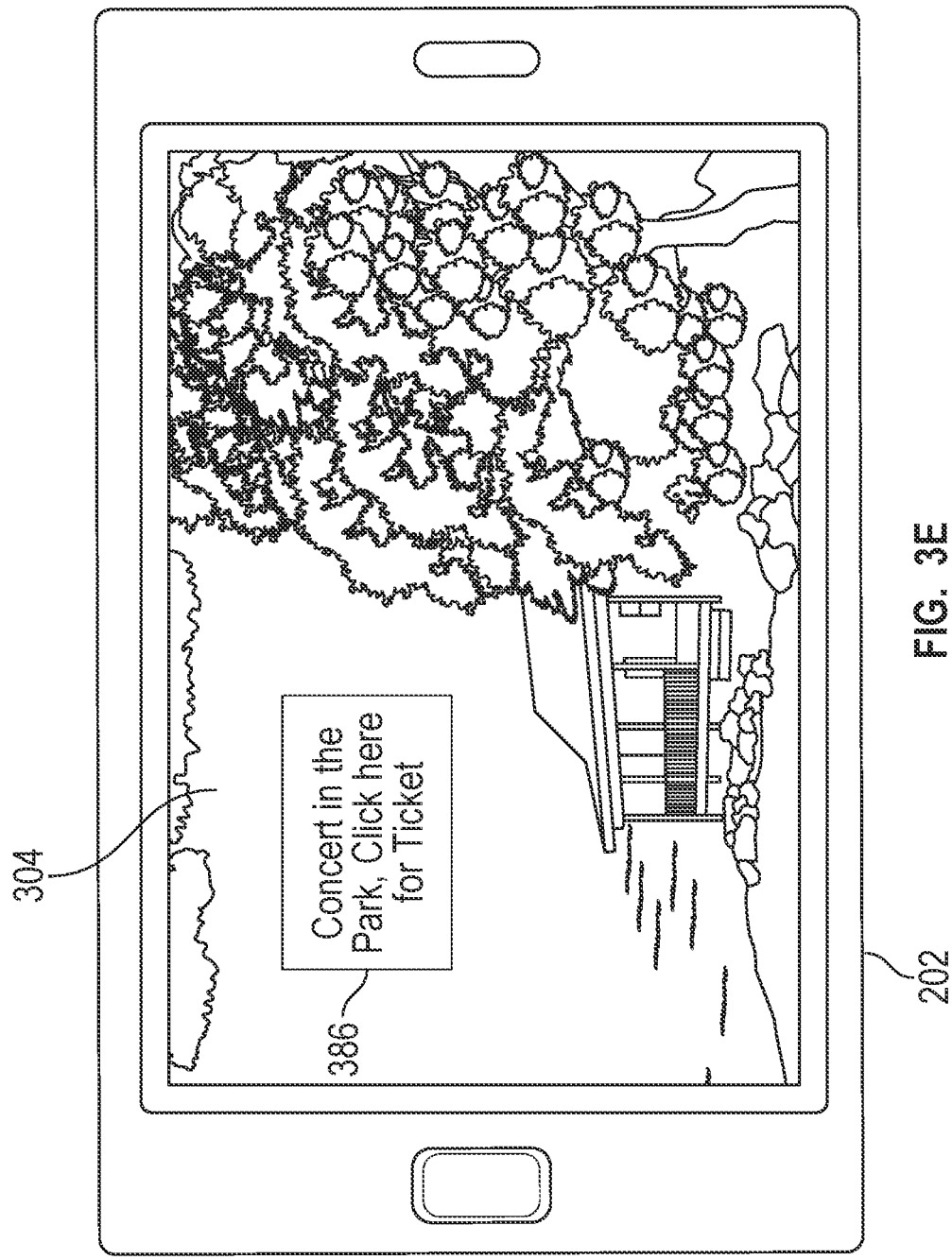
FIG. 3E depicts a user device displaying a computer-generated reality interface including virtual objects and representations of identified entities.

With reference to FIG. 3E and similar to those described above, based on the determination that one or more entities in the physical environment are entities of the first type (e.g., inliers), the user device determines the type of the physical environment the user device is facing or positioned in. As described above, in the examples shown in FIGS. 3A-3D, the user device determines that tree leaf 311A is an entity of the second type (e.g., outlier) and that tree trunk 311B is an entity of the first type (e.g., inlier). In some embodiments, based on the determination that the entities identified include at least one entity of the first type, the user device can proceed to determine the type of the physical environment. In some embodiments, the user device may require more than one entity to be entities of the first type before it can determine the type of the physical environment. For example, the user device may identify additional entities (e.g., house 311C, a lake, a lawn, etc.) and determine that one or more of these additional entities are entities of the first type before it determines the type of the physical environment. In some embodiments, the user device can be configured to determine the type of physical environment using other information in addition to the one or more entities of the first type (e.g., tree trunk 311B). For example, the user device can use data collected from a GPS sensor to assistant determining the type of the physical environment shown in FIG. 3E (e.g., the GPS sensor indicates that tree trunk 311B is located within an area of a park).

With reference to FIG. 3E, in some embodiments, based on the determined type of the physical environment, the user device is configured to present one or more virtual objects corresponding to the determined type of the physical environment. As illustrated in FIG. 3E, in some embodiments, user device 202 presents a representation 304 of physical environment 300 (e.g., a park). Representation 304 can be, for example, a 2D image, a video, an animation, a 3D image, or any type of visual representation of the physical environment or particular entities of the physical environment. For example, user device 202 presents a representation of the identified entities (first type and/or second type) in the physical environment (e.g., a representation of tree leaf 311A, a representation of tree trunk 311B, etc.).

In some embodiments, user device 202 can be configured to, while presenting representation 304 of the park, provide one or more services using one or more virtual objects corresponding to the physical environment. With reference to FIG. 3E, as described above, the type of the physical environment in this embodiment is determined to be a park. As a result, user device 202 can provide, for example, a virtual object 386 (e.g., a user-interaction mechanism) enabling the user to order ticket of a concert in the park.

As described above, physical environments (e.g., indoor environment or outdoor environment) may include a variety of entities. Some of these entities are transitory items that may not be reliable indicators for determining the type of physical environment. Such transitory items (e.g., a cat, a vehicle) can have high mobility relative to other, more relatively stationary items (e.g., a building, a tree). In some embodiments, transitory items are not used for determining the type of physical environment.

Figure 4:
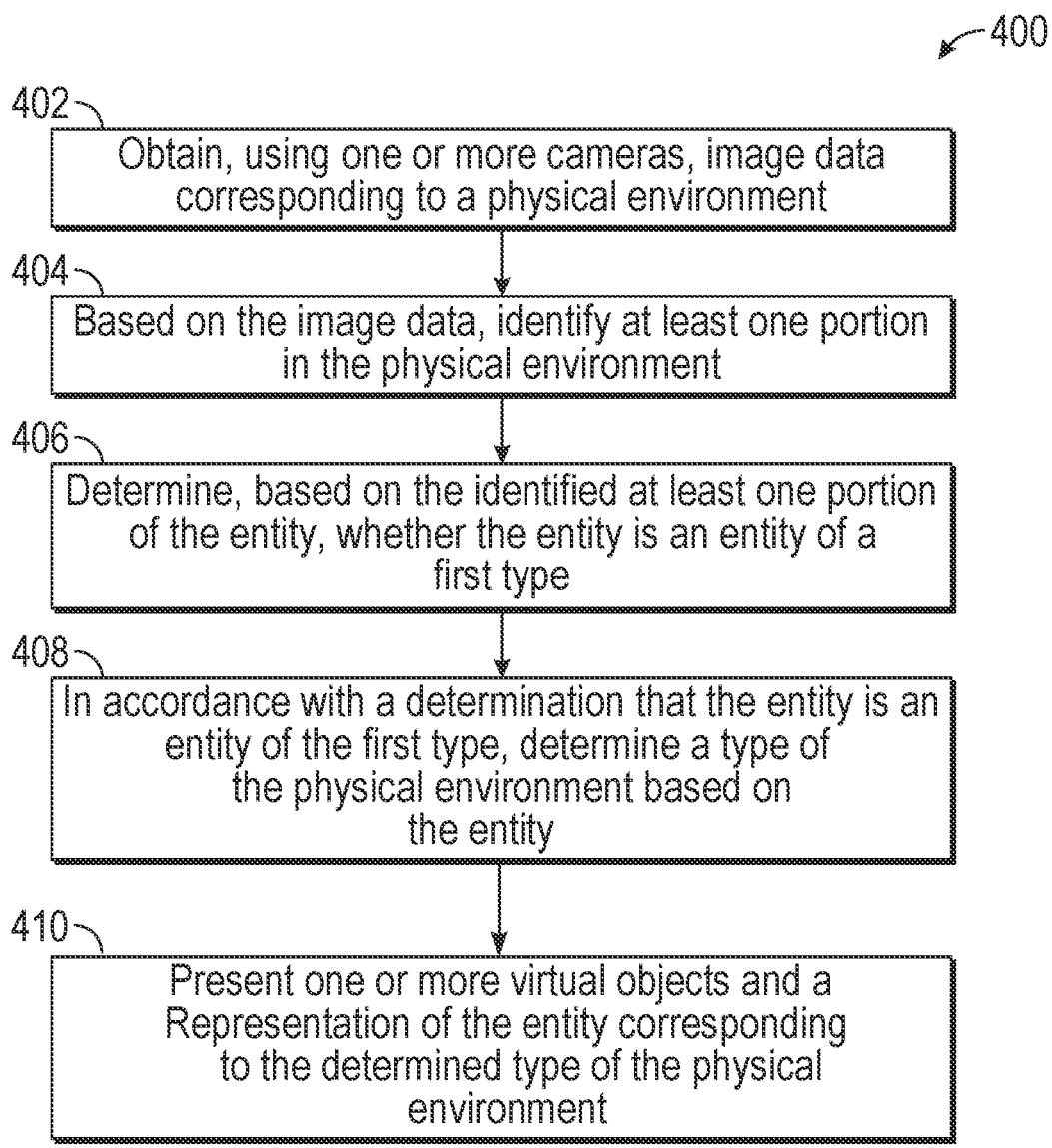
FIG. 4 depicts a flow chart of an exemplary technique for providing content in a computer-generated reality interface.

Turning now to FIG. 4, a flow chart of exemplary process 400 for identifying a type of a physical environment amongst a plurality of types of physical environments. In the description below, process 400 is described as being performed using a user device (e.g., device 100a or 202). The user device is, for example, a handheld mobile device or a head-mounted device. It should be recognized that, in other embodiments, process 400 is performed using two or more electronic devices, such as a user device that is communicatively coupled to another device, such as a base device. In these embodiments, the operations of process 400 are distributed in any manner between the user device and the other device. Further, it should be appreciated that the display of the user device can be transparent or opaque. Although the blocks of process 400 are depicted in a particular order in FIG. 4, it should be appreciated that these blocks can be performed in any order. Further, one or more blocks of process 400 can be optional and/or additional blocks can be performed.

At block 402, image data corresponding to a physical environment are obtained using the one or more cameras.

At block 404, at least one portion of an entity in the physical environment is identified based on the image data. In some embodiments, identifying at least one portion of an entity in the physical environment includes using a plurality of entity classifiers. In some embodiments, identifying at least one portion of an entity in the physical environment includes identifying a first portion of the entity without identifying the entire entity and foregoing identifying a second portion of the entity.

At block 406, based on the identified at least one portion of the entity, whether the entity is an entity of a first type is determined. In some embodiments, based on the identified at least one portion of the entity and prior to determining whether the entity is an entity of the first type, whether the at least one portion of the entity corresponds to at least one portion of a previously identified entity is determined. In accordance with a determination that the at least one portion of the entity does not correspond to at least one portion of a previously-identified entity, data indicative of the at least one portion of the entity are stored.

In some embodiments, determining, based on the identified at least one portion of the entity, whether the entity is an entity of the first type includes determining, based on the identified at least one portion of the entity in the physical environment, one or more properties of the entity; and determining, based on the one or more properties of the entity, whether the entity is an entity of the first type. The one or more properties of the entity can include, for example, mobility of the entity, an indication of whether the entity is a building structure, consistency of the appearance of the entity, and/or the likelihood of erroneous classification.

In some embodiments, determining, based on the identified at least one portion of the entity, whether the entity is an entity of the first type includes determining whether a combination of the one or more properties of the entity exceeds a confidence threshold.

At block 408, in accordance with a determination that the entity is an entity of the first type, a type of the physical environment is determined based on the entity. In some embodiments, determining the type of the physical environment includes determining whether the entity corresponds to at least one of a plurality of types of the physical environments. In accordance with a determination that the entity corresponds to at least one of the plurality of types of the physical environments, one of the plurality of types of the physical environments is selected. In some embodiments, determining the type of the physical environment further includes determining one or more additional types of the physical environments; presenting the determined one or more additional types of the physical environments; and receiving, from a user, a selection of one of the determined types of the physical environments.

At block 410, one or more virtual objects and a representation of the entity corresponding to the determined type of the physical environment are presented.

In some embodiments, input representing a selection of a virtual object of the one or more presented virtual objects is received. One or more tasks in accordance with the selected virtual object are performed.

As described above, one aspect of the present technology is the gathering and use of data available from various sources to improve the performance of identifying the type of physical environment the user is associated with (e.g., located in) and providing information or services to the user based on the identified type of physical environment. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to providing customized information or services to the user. Accordingly, use of such personal information data enables users to receive more customized and/or personalized information or services. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing personalize or customized services, the present technology can be configured to allow users to select to "opt in" or "opt out" of participation in the collection of personal information data during registration for services or anytime thereafter. In another example, users can select not to provide personal information (e.g., recently viewed movies in a living room) for receiving services. In yet another example, users can select to limit the length of time personal information is maintained or entirely prohibit the development of a baseline personal preferences profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, information or services can be selected and delivered to users by inferring preferences based on non-personal information data or a bare minimum amount of personal information, such as the content being requested by the device associated with a user, other non-personal information available to the user device providing services, or publicly available information.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
one or more processors; and
memory storing one or more programs configured to be executed by the one or more processors, the one or more programs including instructions for:
presenting one or more virtual objects and a representation of a first entity from a set of one or more entities in a physical environment, wherein a virtual object of the one or more virtual object performs one or more tasks corresponding to the physical environment;
receiving a set of one or more inputs representing a selection of the virtual object of the one or more presented virtual objects; and
in response to receiving the set of one or more inputs representing the selection of the virtual object, performing the one or more tasks corresponding to the physical environment, wherein performing the one or more tasks includes changing a state of a second entity from the set of one or more entities in the physical environment.

2. The electronic device of claim 1, further comprising:
prior to presenting the one or more virtual objects and the representation of the first entity corresponding to the physical environment:
identifying at least one portion of the first entity from a set of one or more entities in the physical environment;
determining whether the at least one portion of the first entity corresponds to at least one portion of a previously-identified entity;
in accordance with a determination that the at least one portion of the first entity does not correspond to at least one portion of a previously-identified entity, storing data indicative of the at least one portion of the entity;
determining, based on the at least one portion of the first entity, whether the first entity is of a first type; and
in accordance with a determination that the first entity is of the first type, determining a type of the physical environment based on the first entity.

3. The electronic device of claim 2, wherein identifying the at least one portion of the first entity in the physical environment comprises:
identifying a first portion of the first entity without identifying an entire first entity; and
foregoing identifying a second portion of the first entity.

4. The electronic device of claim 2, wherein determining, based on the identified at least one portion of the first entity, whether the first entity is an entity of the first type comprises:
determining, based on the identified at least one portion of the first entity in the physical environment, one or more properties of the entity; and
determining, based on the one or more properties of the entity, whether the first entity is an entity of the first type.

5. The electronic device of claim 4, wherein determining, based on the identified at least one portion of the first entity, the one or more properties of the first entity comprises:
classifying the first entity based on the identified at least one portion of the first entity; and obtaining, based on the classification of the first entity, one or more properties of the first entity from a plurality of properties.

6. The electronic device of claim 4, wherein the one or more properties of the first entity comprise at least one of:
mobility of the first entity;
an indication of whether the first entity is a building structure; and
consistency of an appearance of the first entity.

7. The electronic device of claim 4, wherein the determining, based on the one or more properties of the first entity, whether the first entity is an entity of the first type comprises:
determining whether a combination of the one or more properties of the first entity exceeds a confidence threshold.

8. The electronic device of claim 2, wherein determining the type of the physical environment based on the first entity comprises:
determining whether the first entity corresponds to at least one of a plurality of types of the physical environments; and
in accordance with a determination that the first entity corresponds to at least one of the plurality of types of the physical environments, selecting one of the plurality of types of the physical environments.

9. The electronic device of claim 8, further comprising:
determining one or more additional types of the physical environments;
presenting the determined one or more additional types of the physical environments; and
receiving, from a user, a selection of one of the determined types of the physical environments.

10. A non-transitory computer-readable storage medium storing one or more programs configured to be executed by one or more processors of an electronic device, the one or more programs including instructions for:
presenting one or more virtual objects and a representation of a first entity from a set of one or more entities in a physical environment, wherein a virtual object of the one or more virtual object performs one or more tasks corresponding to the physical environment;
receiving a set of one or more inputs representing a selection of the virtual object of the one or more presented virtual objects; and
in response to receiving the set of one or more inputs representing the selection of the virtual object, performing the one or more tasks corresponding to the physical environment, wherein performing the one or more tasks includes changing a state of a second entity from the set of one or more entities in the physical environment.

11. The non-transitory computer-readable storage medium of claim 10, the one or more programs further including instructions for:
prior to presenting the one or more virtual objects and the representation of the first entity corresponding to the physical environment:
identifying at least one portion of the first entity from a set of one or more entities in the physical environment;
determining whether the at least one portion of the first entity corresponds to at least one portion of a previously-identified entity;
in accordance with a determination that the at least one portion of the first entity does not correspond to at least one portion of a previously-identified entity, storing data indicative of the at least one portion of the entity;
determining, based on the at least one portion of the first entity, whether the first entity is of a first type; and
in accordance with a determination that the first entity is of the first type, determining a type of the physical environment based on the first entity.

12. The computer-readable storage medium of claim 11, wherein identifying the at least one portion of the first entity in the physical environment comprises:
identifying a first portion of the first entity without identifying an entire first entity; and
foregoing identifying a second portion of the first entity.

13. The computer-readable storage medium of claim 11, wherein determining, based on the identified at least one portion of the first entity, whether the first entity is an entity of the first type comprises:
determining, based on the identified at least one portion of the first entity in the physical environment, one or more properties of the entity; and
determining, based on the one or more properties of the entity, whether the first entity is an entity of the first type.

14. The computer-readable storage medium of claim 13, wherein determining, based on the identified at least one portion of the first entity, the one or more properties of the first entity comprises:
classifying the first entity based on the identified at least one portion of the first entity; and
obtaining, based on the classification of the first entity, one or more properties of the first entity from a plurality of properties.

15. The computer-readable storage medium of claim 13, wherein the one or more properties of the first entity comprise at least one of:
mobility of the first entity;
an indication of whether the first entity is a building structure; and
consistency of an appearance of the first entity.

16. The computer-readable storage medium of claim 13, wherein the determining, based on the one or more properties of the first entity, whether the first entity is an entity of the first type comprises:
determining whether a combination of the one or more properties of the first entity exceeds a confidence threshold.

17. The computer-readable storage medium of claim 11, wherein determining the type of the physical environment based on the first entity comprises:
determining whether the first entity corresponds to at least one of a plurality of types of the physical environments; and
in accordance with a determination that the first entity corresponds to at least one of the plurality of types of the physical environments, selecting one of the plurality of types of the physical environments.

18. The computer-readable storage medium of claim 17, the one or more programs further including instructions for:
determining one or more additional types of the physical environments;
presenting the determined one or more additional types of the physical environments; and
receiving, from a user, a selection of one of the determined types of the physical environments.

19. A method comprising:
at an electronic device with one or more processors, and memory:
- presenting one or more virtual objects and a representation of a first entity from a set of one or more entities in a physical environment, wherein a virtual object of the one or more virtual object performs one or more tasks corresponding to the physical environment;
- receiving a set of one or more inputs representing a selection of the virtual object of the one or more presented virtual objects; and
- in response to receiving the set of one or more inputs representing the selection of the virtual object, performing the one or more tasks corresponding to the physical environment, wherein performing the one or more tasks includes changing a state of a second entity from the set of one or more entities in the physical environment.

20. The method of claim 19, further comprising:
prior to presenting the one or more virtual objects and the representation of the first entity corresponding to the physical environment:
- identifying at least one portion of the first entity from a set of one or more entities in the physical environment;
- determining whether the at least one portion of the first entity corresponds to at least one portion of a previously-identified entity;
- in accordance with a determination that the at least one portion of the first entity does not correspond to at least one portion of a previously-identified entity, storing data indicative of the at least one portion of the entity;
- determining, based on the at least one portion of the first entity, whether the first entity is of a first type; and
- in accordance with a determination that the first entity is of the first type, determining a type of the physical environment based on the first entity.

21. The method of claim 20, wherein identifying the at least one portion of the first entity in the physical environment comprises:
- identifying a first portion of the first entity without identifying an entire first entity; and
- foregoing identifying a second portion of the first entity.

22. The method of claim 20, wherein determining, based on the identified at least one portion of the first entity, whether the first entity is an entity of the first type comprises:
- determining, based on the identified at least one portion of the first entity in the physical environment, one or more properties of the entity; and
- determining, based on the one or more properties of the entity, whether the first entity is an entity of the first type.

23. The method of claim 22, wherein determining, based on the identified at least one portion of the first entity, the one or more properties of the first entity comprises:
- classifying the first entity based on the identified at least one portion of the first entity; and
- obtaining, based on the classification of the first entity, one or more properties of the first entity from a plurality of properties.

24. The method of claim 22, wherein the determining, based on the one or more properties of the entity, whether the entity is an entity of the first type comprises:
- determining whether a combination of the one or more properties of the entity exceeds a confidence threshold.

* * * * *